(12) United States Patent
Mok et al.

(10) Patent No.: US 12,015,945 B2
(45) Date of Patent: *Jun. 18, 2024

(54) METHOD AND APPARATUS FOR TRANSMITTING PACKET IN VEHICLE TO EVERYTHING SERVICE

(71) Applicant: Samsung Electronics Co., Ltd., Gyeonggi-do (KR)

(72) Inventors: Youngjoong Mok, Gyeonggi-do (KR); Hyun Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 337 days.

This patent is subject to a terminal disclaimer.

(21) Appl. No.: 17/526,735

(22) Filed: Nov. 15, 2021

(65) Prior Publication Data

US 2022/0078664 A1 Mar. 10, 2022

Related U.S. Application Data

(63) Continuation of application No. 16/651,157, filed as application No. PCT/KR2018/011151 on Sep. 20, 2018, now Pat. No. 11,178,569.

(30) Foreign Application Priority Data

Sep. 27, 2017 (KR) ........................ 10-2017-0125359

(51) Int. Cl.
*H04W 28/02* (2009.01)
*H04L 1/00* (2006.01)
*H04W 28/04* (2009.01)

(52) U.S. Cl.
CPC ....... *H04W 28/0268* (2013.01); *H04L 1/0017* (2013.01); *H04W 28/04* (2013.01); *H04W 28/02* (2013.01)

(58) Field of Classification Search
None
See application file for complete search history.

(56) References Cited

U.S. PATENT DOCUMENTS

| 9,113,358 B1 | 8/2015 | Lachwant |
| 9,338,715 B1 | 5/2016 | Sevindik |

(Continued)

FOREIGN PATENT DOCUMENTS

| CN | 103826260 | 5/2014 |
| CN | 105027511 | 11/2015 |

(Continued)

OTHER PUBLICATIONS

Vivo, "PDCP Duplication Impacts on LCP", R2-1708502; revision of R2-1707074, 3GPP TSG-RAN WG2 Meeting #99, Aug. 21-25, 2017, 3 pages.

(Continued)

*Primary Examiner* — Saad Khawar
(74) *Attorney, Agent, or Firm* — The Farrell Law Firm, P.C.

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure provides an apparatus and method for efficiently transmitting a packet in a wireless communication system. The present disclosure provides an operation method for a transmitter in a wireless communication system, the operation method comprising the steps of: mapping a parameter according to quality of service (QoS) information or a service type; determining, on the basis of the parameter, whether to duplicate a packet; when it is determined that the packet is to be duplicated, duplicating the packet; and transmitting the duplicated packets to a receiver.

18 Claims, 28 Drawing Sheets

(56) References Cited

U.S. PATENT DOCUMENTS

| | | | |
|---|---|---|---|
| 11,178,569 B2* | 11/2021 | Mok | H04W 28/0268 |
| 2006/0171407 A1 | 8/2006 | Kim | |
| 2006/0221833 A1 | 10/2006 | Jiang | |
| 2008/0165882 A1 | 7/2008 | Hedayat | |
| 2008/0232432 A1 | 9/2008 | Lee | |
| 2008/0267122 A1 | 10/2008 | Man | |
| 2009/0003274 A1 | 1/2009 | Kwak | |
| 2010/0182972 A1 | 7/2010 | Katayama | |
| 2011/0013585 A1 | 1/2011 | Jitsukawa | |
| 2012/0155412 A1 | 6/2012 | Kawamura | |
| 2013/0016712 A1 | 1/2013 | Tomeba | |
| 2013/0017836 A1 | 1/2013 | Chang | |
| 2013/0039251 A1 | 2/2013 | Wilkinson | |
| 2013/0051236 A1 | 2/2013 | Bush | |
| 2013/0070703 A1 | 3/2013 | Yasukawa | |
| 2013/0242859 A1 | 9/2013 | Celik et al. | |
| 2014/0226736 A1 | 8/2014 | Niu | |
| 2016/0269207 A1 | 9/2016 | Gaal | |
| 2016/0344782 A1 | 11/2016 | Cheng | |
| 2017/0013582 A1 | 1/2017 | Takekawa | |
| 2017/0127318 A1 | 5/2017 | Goel et al. | |
| 2017/0201603 A1 | 7/2017 | Uchino | |
| 2017/0223732 A1 | 8/2017 | Bertrand | |
| 2017/0230138 A1 | 8/2017 | Xiong | |
| 2018/0152353 A1 | 5/2018 | Bergstrom | |
| 2018/0324642 A1* | 11/2018 | Yu | H04L 5/0053 |
| 2018/0367463 A1 | 12/2018 | Jose | |
| 2019/0029026 A1 | 1/2019 | Yun | |
| 2019/0349829 A1 | 11/2019 | Balasaygun | |
| 2020/0059821 A1 | 2/2020 | Wirth | |
| 2020/0099481 A1 | 3/2020 | Pan | |
| 2020/0119976 A1 | 4/2020 | Xu | |
| 2020/0163140 A1 | 5/2020 | Mochizuki | |
| 2020/0252926 A1 | 8/2020 | Babael | |
| 2020/0275303 A1 | 8/2020 | Mok | |
| 2020/0314805 A1 | 10/2020 | Tseng | |
| 2020/0336954 A1 | 10/2020 | Park | |
| 2020/0396786 A1 | 12/2020 | Park | |

FOREIGN PATENT DOCUMENTS

| | | |
|---|---|---|
| KR | 10-2014-0138501 | 11/2014 |
| KR | 10-2016-0090477 | 8/2016 |
| KR | 1020180081424 | 7/2018 |
| TW | 200803274 | 1/2008 |
| WO | WO 2008/115125 | 9/2008 |
| WO | WO 2014/119921 | 8/2014 |
| WO | WO 2017/099498 | 6/2017 |
| WO | WO 2018/174683 | 9/2018 |

OTHER PUBLICATIONS

InterDigital Communications, "Packet Duplication at PDCP", R2-1701186, 3GPP TSG-RAN WG2 Meeting #97, Feb. 13-17, 2017, 2 pages.
Oppo, "Packet Duplication in CA-based eV2x", R2-1707699, 3GPP TSG-RAN2 Meeting #99, Aug. 21-25, 2017, 3 pages.
European Search Report dated Aug. 3, 2020 issued in counterpart application No. 18860250.2-1205, 8 pages.
PCT/ISA/210 Search Report dated Jan. 4, 2019 issued on PCT/KR2018/011151, pp. 7.
PCT/ISA/237 Written Opinion dted Jan. 4, 2019 issued on PCT/KR2018/011151, pp. 6.
Itl, "Configuration of PDCP duplication", 3GPP TSG-RAN WG2 Meeting #99, R2-1709628, Berlin, Germany, Aug. 21-Aug. 25, 2017, pp. 3.
Sharp, "PDCP Duplication in CA", 3GPP TSG-RAN2 Adhoc Meeting, R2-1706791, Qingdao, China, Jun. 27-29, 2017, pp. 6.
Samsung, "Efficiency of Packet Duplication for NR", 3GPP TSG-RAN WG2 NR Ad Hoc, R2-1700611 Spokane, USA, Jan. 17-19, 2017, pp. 6.
Samsung, "Outdated and duplicated PDU handling", 3GPP TSG-RAN WG2 Meeting #99, R2-1709599 Berlin Germany, Aug. 21-25, 2017, pp. 5.
European Search Report dated Mar. 1, 2021 issued in counterpart application No. 18860250.2-1205, 5 pages.
Oppo, "PDCP Operation for UL Packet Duplication", R2-1707708, 3GPP TSG-RAN2 Meeting #99, Aug. 21-25, 2017, 2 pages.
Chinese Office Action dated Feb. 18, 2023 Issued in counterpart application No. 201880062916.6, 19 pages.
Indian Examination Report dated May 31, 2022 issued in counterpart application No. 202037012401, 8 pages.
Korean Notice of Patent Grant dated Aug. 11, 2022 issued in counterpart application No. 10-2017-0125359, 4 pages.
Xiaojuan Zhu et al., "Transmission Reliability Evaluation for Wireless Sensor Networks", International Journal of Distributed Sensor Networks, Dec. 31, 2016, 10 pages.
Korean Office Action dated Apr. 1, 2022 issued in counterpart application No. 10-2017-0125359, 11 pages.
European Search Report dated Mar. 2, 2022 issued in counterpart application No. 18860250.2-1205, 6 pages.

* cited by examiner

| QCI | Resource Type | Priority Level | Packet Delay Budget (NOTE 13) | Packet Error Loss Rate (NOTE 2) | Example Services |
|---|---|---|---|---|---|
| 1 (NOTE 3) | GBR | 2 | 100ms (NOTE 1, NOTE 11) | $10^{-2}$ | Conversational Voice |
| 2 (NOTE 3) | GBR | 4 | 150ms (NOTE 1, NOTE 11) | $10^{-3}$ | Conversational Voice (Live Streaming) |
| 3 (NOTE 3) NOTE 14 | GBR | 3 | 50ms (NOTE 1, NOTE 11) | $10^{-3}$ | Real Time Gaming, V2X messages |
| 4 (NOTE 3) | GBR | 5 | 300ms (NOTE 1, NOTE 11) | $10^{-6}$ | Non-Conversational Voice (Buffered Streaming) |
| 65 (NOTE 3, NOTE 9, NOTE 12) | GBR | 0.7 | 75ms (NOTE 7, NOTE 8) | $10^{-2}$ | Mission Critical user plane Push To Talk voice (e.g., MCPTT) |
| 66 (NOTE 3, NOTE 12) | GBR | 2 | 100ms (NOTE 1, NOTE 10) | $10^{-2}$ | Non-Mission-Critical user plane Push To Talk voice |
| 75 (NOTE 14) | GBR | 2.5 | 50ms (NOTE 1) | $10^{-2}$ | V2X messages |
| 5 (NOTE 3) | Non-GBR | 1 | 100ms (NOTE 1, NOTE 10) | $10^{-6}$ | IMS Signalling |
| 6 (NOTE 4) | Non-GBR | 6 | 300ms (NOTE 1, NOTE 10) | $10^{-6}$ | Video (Buffered Streaming) TCP-based (e.g., www, email, chat, ftp, p2p file sharing, progressive video, etc.) |
| 7 (NOTE 3) | Non-GBR | 7 | 100ms (NOTE 1, NOTE 10) | $10^{-3}$ | Video, Video (Live Streaming) Interactive Gaming |
| 8 (NOTE 5) | Non-GBR | 8 | 300ms (NOTE 1) | $10^{-6}$ | Video (Buffered Streaming) TCP-based (e.g., www, email, chat, ftp, p2p file sharing, progressive video, etc.) |
| 9 (NOTE 6) | Non-GBR | 9 | 300ms (NOTE 1) | $10^{-6}$ | |
| 69 (NOTE 3, NOTE 9, NOTE 12) | Non-GBR | 0.5 | 60ms (NOTE 7, NOTE 8) | $10^{-6}$ | Mission Critical delay sensitive signalling (e.g., MC-PTT signalling) |
| 70 (NOTE 4, NOTE 12) | Non-GBR | 5.5 | 200ms (NOTE 7, NOTE 10) | $10^{-6}$ | Mission Critical Data (e.g., example services are the same as QCI 6/8/9) |
| 79 (NOTE 14) | Non-GBR | 6.5 | 50ms (NOTE 1, NOTE 10) | $10^{-2}$ | V2X messages |

FIG.10

| SQI Value | Resource Type | Priority Level | Packet Delay Budget | Packet Error Loss Rate | Default Averaging Window | Example Services |
|---|---|---|---|---|---|---|
| 1 | GBR | 20 | 100ms | $10^{-2}$ | TBD | Conversational Voice |
| 2 | | 40 | 150ms | $10^{-3}$ | TBD | Conversational Voice (Live Streaming) |
| 3 | | 30 | 50ms | $10^{-3}$ | TBD | Real Time Gaming, V2X messages |
| 4 | | 50 | 300ms | $10^{-6}$ | TBD | Non-Conversational Voice (Buffered Streaming) |
| 65 | | 7 | 75ms | $10^{-2}$ | TBD | Mission Critical user plane Push To Talk voice (e.g., MCPTT) |
| 66 | | 20 | 100ms | $10^{-2}$ | TBD | Non-Mission-Critical user plane Push To Talk voice |
| 75 | | 25 | 50ms | $10^{-2}$ | TBD | V2X messages |
| 5 | Non-GBR | 10 | 100ms | $10^{-6}$ | N/A | IMS Signalling |
| 6 | | 60 | 300ms | $10^{-6}$ | N/Ar | Video (Buffered Streaming) TCP-based (e.g., www, email, chat, ftp, p2p file sharing, progressive video, etc.) |
| 7 | | 70 | 100ms | $10^{-3}$ | | Video, Video (Live Streaming) Interactive Gaming |
| 8 | | 80 | 300ms | $10^{-6}$ | N/A | Video (Buffered Streaming) TCP-based (e.g., www, email, chat, ftp, p2p file sharing, progressive video, etc.) |
| 9 | | 90 | | | N/A | Sharing progressive video, etc |
| 69 | | 5 | 60ms | $10^{-6}$ | N/A | Mission Critical delay sensitive signalling (e.g., MC-PTT signalling) Mission Critical Data (e.g., example services are the same as QCI 6/8/9) |
| 70 | | 55 | 200ms | $10^{-6}$ | N/A | Mission Critical Data (e.g., example services are the same as QCI 6/8/9) |
| 79 | | 65 | 50ms | $10^{-2}$ | N/A | V2X messages |
| | | | | | N/A | |

FIG.11

METHOD AND APPARATUS FOR TRANSMITTING PACKET IN VEHICLE TO EVERYTHING SERVICE

PRIORITY

This application is a Continuation of U.S. patent application Ser. No. 16/651,157, filed on Mar. 26, 2020, which is a National Phase Entry of PCT International Application No. PCT/KR2018/011151, which was filed on Sep. 20, 2018, and claims priority to Korean Patent Application No. 10-2017-0125359, which was filed on Sep. 27, 2017, the content of each of which are incorporated herein by reference.

TECHNICAL FIELD

The disclosure generally relates to a wireless communication system and, more particularly, to an apparatus and a method for transmitting a packet in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 5G systems, consideration is given to packet duplication technology as one method to improve the reliability of transmission of data. According to packet duplication technology, a transmitter may produce a plurality of packets by duplicating one packet, and may transmit the packets through different paths. This is intended to prepare for the situation in which data is lost. Therefore, detailed procedures for introducing packet duplication technology to 5G systems are under discussion.

DISCLOSURE OF INVENTION

Technical Problem

Based on the discussion described above, the disclosure provides an apparatus and a method for efficiently transmitting a packet in a wireless communication system.

Solution to Problem

According to various embodiments of the disclosure, an operation method of a transmitter in a wireless communication system may include: mapping a parameter according to quality of service (QoS) information or a service type; determining whether or not to duplicate a packet, based on the parameter; if it is determined to duplicate the packet, duplicating the packet; and transmitting duplicated packets to a receiver.

According to various embodiments of the disclosure, an operation method of a receiver in a wireless communication system may include: obtaining packet duplication configuration information; receiving two or more packets from a transmitter; and determining whether or not the two or more packets are duplicated packets, based on the packet duplication configuration information.

According to various embodiments of the disclosure, a transmitter device in a wireless communication system may include a transceiver configured to transmit and receive signals and at least one processor operably connected to the transceiver, wherein the at least one processor may be configured to map a parameter according to quality of service (QoS) information or a service type, determine whether or not to duplicate a packet, based on the parameter, if it is determined to duplicate the packet, duplicate the packet, and transmit duplicated packets to a receiver by controlling the transceiver.

According to various embodiments of the disclosure, a receiver device in a wireless communication system may include a transceiver configured to transmit and receive signals and at least one processor operably connected to the transceiver, wherein the at least one processor may be configured to obtain packet duplication configuration information, receive two or more packets from a transmitter by controlling the transceiver, and determine whether or not the two or more packets are duplicated packets, based on the packet duplication configuration information.

According to various embodiments of the disclosure, an operation method of a transmitter in a wireless communication system may include: determining a parameter for packet reliability; determining whether or not to duplicate a packet, based on the parameter; if it is determined to duplicate the packet, duplicating the packet; and transmitting duplicated packets to a receiver.

According to various embodiments of the disclosure, an operation method of a receiver in a wireless communication system may include: receiving two or more packets from a transmitter; determining whether or not the two or more packets are duplicated packets; and, if it is determined that the two or more packets are duplicated packets, performing packet reordering.

According to various embodiments of the disclosure, an apparatus configured to perform the operation method of a transmitter or a receiver in a wireless communication system is provided.

Advantageous Effects of Invention

An apparatus and a method according to various embodiments of the disclosure enable efficient transmission and reception of data packets in a wireless communication system.

Effects which can be acquired by the disclosure are not limited to the above described effects, and other effects that have not been mentioned may be clearly understood by those skilled in the art from the following description.

BRIEF DESCRIPTION OF DRAWINGS

FIG. 10 illustrates parameters available in an LTE system among quality of service (QoS) parameters according to various embodiments of the disclosure.

FIG. 11 illustrates parameters available in a 5G system among QoS parameters according to various embodiments of the disclosure.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, the disclosure relates to an apparatus and a method for transmitting packets in a wireless communication system. Specifically, the disclosure describes a technique for transmitting packets using packet duplication technology in a wireless communication system.

In the following description, terms referring to communication schemes, terms referring to signals, terms referring to information, terms referring to network entities, terms referring to components of an apparatus, and the like are illustrative words for the convenience of explanation. Accordingly, the disclosure is not limited to the terms described below, and other terms having equivalent technical meanings may be used.

Figure 1:
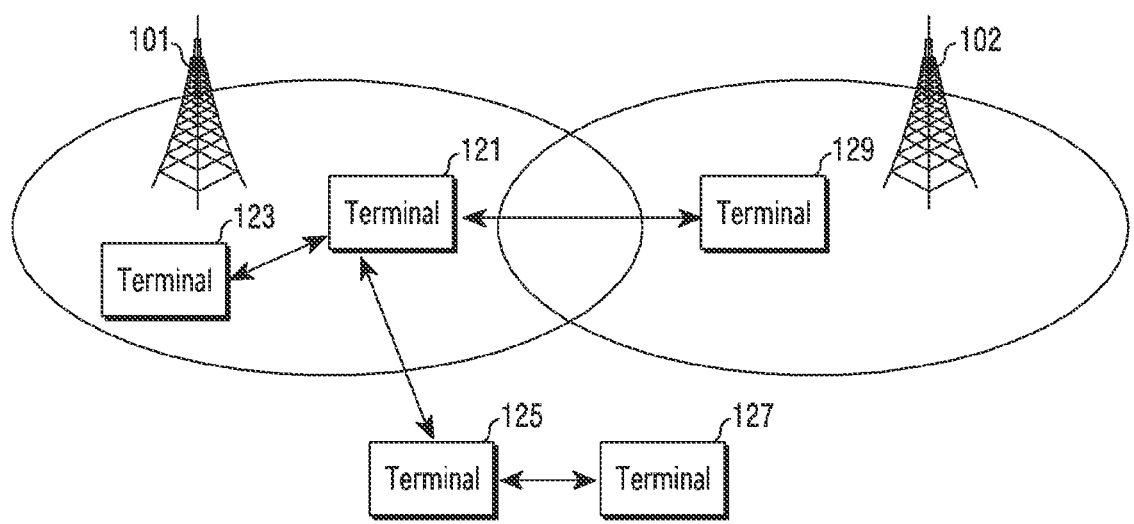
FIG. 1 illustrates a wireless communication system according to various embodiments of the disclosure.

FIG. 1 illustrates a wireless communication system according to various embodiments of the disclosure. FIG. 1 illustrates base stations 101 and 102 and terminals 121, 123, 125, 127, and 129 as parts of nodes using wireless channels in a wireless communication system.

The base stations 101 and 102 are network infrastructure that provides wireless access to the terminals 121, 123, 125, 127, and 129. The base station 101 or 102 has a coverage defined as a certain geographic area based on the distance over which signals can be transmitted. The base station 101 or 102 may be referred to as an "access point (AP)", an "eNodeB (eNB)", a "5th generation (5G) node", a "wireless point", a "transmission/reception point (TRP)", or other terms having equivalent technical meanings, as well as "base station".

Each of the terminals 121, 123, 125, 127, and 129 is a device used by a user and communicates with the base stations 101 and 102 via wireless channels. In some cases, at least one of the terminals 121, 123, 125, 127, and 129 may be operated without user involvement. That is, at least one of the terminals 121, 123, 125, 127, and 129 may be a device for performing machine-type communication (MTC), and may not be carried by a user. Each of the terminals 121, 123, 125, 127, and 129 may be referred to as "user equipment (UE)", a "mobile station", a "subscriber station", a "remote terminal", a "wireless terminal", a "user device", or other terms having equivalent technical meanings, as well as "terminal".

Referring to FIG. 1, various examples of communication are shown. For example, communication may be made between the base station 101 and the terminal 121. As another example, communication using a direct link between any two terminals may be performed. That is, communication using a direct link may be made between two terminals 121 and 123 within the service range of the base station 101, communication using a direct link may be made between a terminal 121 within the service range of the base station 101 and a terminal 125 outside the service range thereof, and communication using a direct link may be made between two terminals 125 and 127 outside the service range of the base station 101. Alternatively, communication using a direct link may be performed between the terminals 121 and 129 which fall within service ranges of different base stations 101 and 102, respectively.

For communication using a direct link, the terminals 121, 123, 125, 127, and 129 may use an intelligent transportation systems (ITS) band (e.g., 5.9 GHz), instead of using the frequency resources of the base stations 101 and 102. The terminals 121 and 123 within the service range of the base station 101 may configure parameters for communication by the base station 101, the terminal 129 within the service range of the base station 102 may configure parameters for communication by the base station 102, and the terminals 125 and 127 located outside the service range of the base station 101 may operate according to a predefined configuration.

In the disclosure, the terminals 121, 123, 125, and 127 may operate as a transmitter or a receiver in performing communication with each other. The roles of the transmitter and the receiver are not fixed, but may be variable. For example, the terminal 121 may operate as a transmitter in a certain time, and may operate as a receiver in another time. Alternatively, the terminal 121 may operate as a transmitter in one frequency band, and may operate as a receiver in another frequency band.

Figure 2:
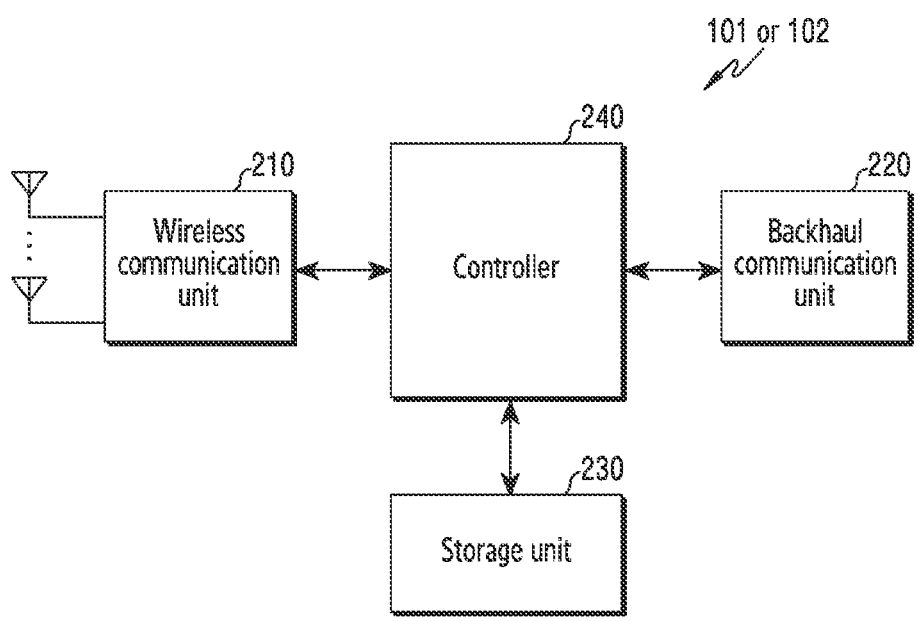
FIG. 2 illustrates the configuration of a base station in a wireless communication system according to various embodiments of the disclosure.

FIG. 2 illustrates the configuration of a base station in a wireless communication system according to various embodiments of the disclosure. The configuration illustrated in FIG. 2 may be regarded as the configuration of the base station 101. Hereinafter, the term "-unit", "-or (er)", or the like denotes a unit for processing at least one function or operation, and may be implemented as hardware, software, or a combination thereof.

FIG. 2 illustrates the configuration of a base station in a wireless communication system according to various embodiments of the disclosure. The configuration illustrated in FIG. 2 may be regarded as the configuration of the base station 101. Hereinafter, the term "-unit", "-or (er)", or the like denotes a unit for processing at least one function or operation, and may be implemented as hardware, software, or a combination thereof.

Referring to FIG. 2, the base station includes a wireless communication unit 210, a backhaul communication unit 220, a storage unit 230, and a controller 240.

The wireless communication unit 210 may perform functions of transmitting and receiving signals via a wireless channel. For example, the wireless communication unit 210 may perform a function of transformation between a baseband signal and a bit stream according to the physical layer standard of a system. For example, in the case of data transmission, the wireless communication unit 210 may produce complex symbols by encoding and modulating a transmission bit stream. In the case of data reception, the wireless communication unit 210 may restore a reception bit stream by demodulating and decoding a baseband signal.

In addition, the wireless communication unit 210 may up-convert a baseband signal to a radio frequency (RF) band signal to thus transmit the same via an antenna, and may down-convert an RF band signal received via the antenna to a baseband signal. To this end, the wireless communication unit 210 may include a transmitting filter, a receiving filter, an amplifier, a mixer, an oscillator, a digital-to-analog convertor (DAC), an analog-to-digital convertor (ADC), and the like. In addition, the wireless communication unit 210 may include a plurality of transmission/reception paths. Further, the wireless communication unit 210 may include at least one antenna array including a plurality of antenna elements.

In terms of hardware, the wireless communication unit 210 may include a digital unit and an analog unit, and the analog unit may include a plurality of sub-units depending on the operation power, operation frequency, or the like. The digital unit may include at least processor (e.g., a digital signal processor (DSP)).

The wireless communication unit 210 may transmit and receive signals as described above. Accordingly, all or some of the wireless communication unit 210 may be referred to as a "transmitter", a "receiver", or a "transceiver". In the following description, the transmission and reception performed via a wireless channel will have a meaning encompassing the execution of the process by the wireless communication unit 210 as described above.

The backhaul communication unit 220 provides an interface for communication with other nodes in the network. That is, the backhaul communication unit 220 converts a bit stream, transmitted from the base station to another node, such as another access node, another base station, an upper node, or a core network, into a physical signal, and converts a physical signal received from another node into a bit stream.

The storage unit 230 stores data such as fundamental programs, application programs, and configuration information for the operation of the base station. The storage unit 230 may be configured as volatile memory, nonvolatile memory, or a combination thereof. In addition, the storage unit 230 provides the stored data upon request by the controller 240.

The controller 240 controls the overall operation of the base station. For example, the controller 240 transmits and receives signals via the wireless communication unit 210 or the backhaul communication unit 220. The controller 240 writes or reads data to or from the storage unit 230. In addition, the controller 240 may perform the functions of a protocol stack required for the communication standard. Alternatively, the protocol stack may be included in the wireless communication unit 210. To this end, the controller 240 may include at least one processor.

Figure 3:
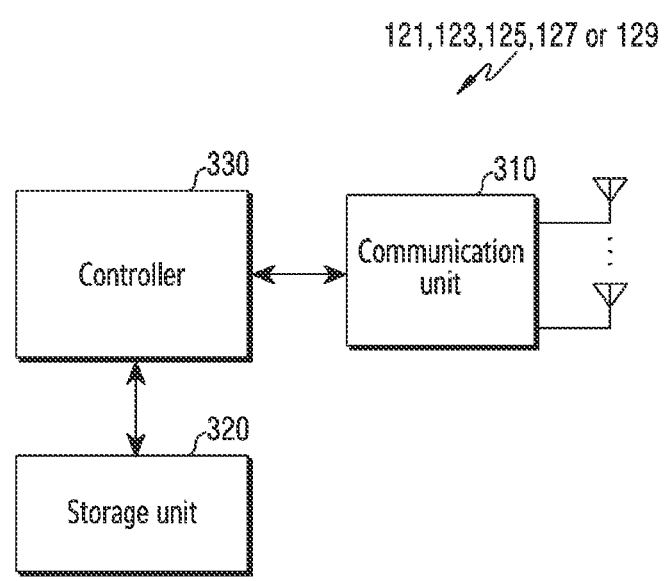
FIG. 3 illustrates the configuration of a terminal in a wireless communication system according to various embodiments of the disclosure.

FIG. 3 illustrates the configuration of a terminal in a wireless communication system according to various embodiments of the disclosure. The configuration illustrated in FIG. 3 may be regarded as the configuration of one of the terminals 121, 123, 125, 127, and 129. Hereinafter, the term "-unit", "-or (er)", or the like denotes a unit for processing at least one function or operation, and may be implemented by hardware, software, or a combination thereof.

Referring to FIG. 3, the terminal includes a communication unit 310, a storage unit 320, and a controller 330.

The communication unit 310 performs functions of transmitting and receiving signals via a wireless channel. For example, the communication unit 310 may perform a function of transformation between a baseband signal and a bit stream according to the physical layer standard of a system. For example, in the case of data transmission, the communication unit 310 may produce complex symbols by encoding and modulating a transmission bit stream. In the case of data reception, the communication unit 310 may restore a reception bit stream by demodulating and decoding a baseband signal. In addition, the communication unit 310 may up-convert a baseband signal to an RF band signal to thus transmit the same via an antenna, and may down-convert an RF band signal received via the antenna to a baseband signal. For example, the communication unit 310 may include a transmitting filter, a receiving filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit {e.g., a radio frequency integrated circuit (RFIC)}. The digital circuit and the analog circuit may be implemented as a single package. In addition, the communication unit 310 may include a plurality of RF chains. The communication unit 310 may perform beamforming.

Furthermore, the communication unit 310 may include a plurality of communication modules to support a plurality of different wireless access technologies. For example, the different wireless access technologies may include Bluetooth Low Energy (BLE), Wireless Fidelity (Wi-Fi), Wi-Fi Gigabyte (WiGig), cellular networks (e.g., Long-Term Evolution (LTE)}, and the like. In addition, different frequency bands may include a super-high frequency (SHF) (e.g., 3.5 GHz or 5 GHz) band and a millimeter wave (e.g., 60 GHz) band.

The communication unit 310 transmits and receives signals as described above. Accordingly, all or some of the communication unit 310 may be referred to as a "transmitter", a "receiver", or a "transceiver". In the following description, transmission and reception performed via a wireless channel will have a meaning encompassing execution of the process by the communication unit 310 as described above.

The storage unit 320 may store data such as fundamental programs for the operation of the terminal, application programs, and data such as configuration information. The storage unit 320 may be configured as volatile memory, nonvolatile memory, or a combination thereof. In addition, the storage unit 320 provides the stored data upon request by the controller 330.

The controller 330 controls the overall operation of the terminal. For example, the controller 330 transmits and receives signals via the communication unit 310. The controller 330 writes or reads data to or from the storage unit 320. The controller 330 may perform the functions of a protocol stack required for the communication standard. To this end, the controller 330 may include at least one processor or microprocessor, or may be a part of a processor. In addition, a part of the communication unit 310 and the controller 330 may be referred to as a "communication processor (CP)".

Figure 4:
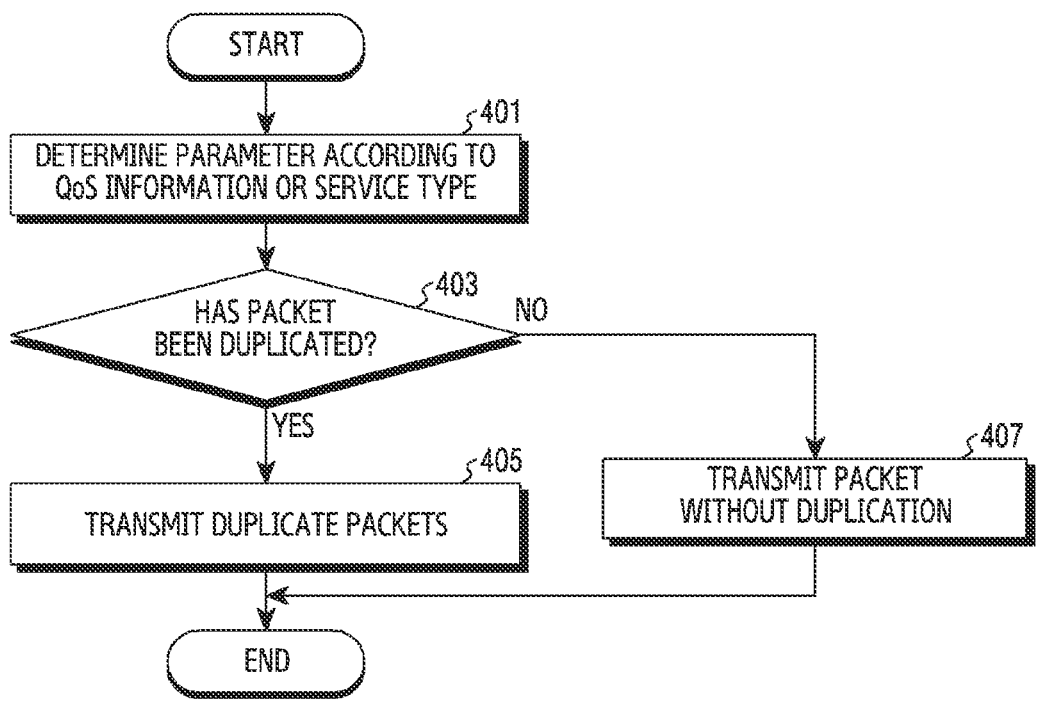
FIG. 4 is a flowchart of a transmitter according to various embodiments of the disclosure.

FIG. 4 is a flowchart illustrating the operation of a transmitter according to various embodiments of the disclosure. FIG. 4 illustrates an operation method of a terminal (e.g., the terminal 121, the terminal 123, the terminal 125, or the terminal 127) operating as a transmitter.

Referring to FIG. 4, in step 401, the transmitter determines a parameter according to QoS information or a service type. The QoS information may include at least one of a QoS class identifier (QCI), a packet delay budget, and a packet error loss rate. The QoS information may be defined according to a service type or information on a packet in a higher layer, for example, in an application layer, such as at least one of a source address, a destination address, or a port number of a packet. The parameter may be defined in various ways. The parameter may include at least one piece of first information on priority for packet transmission and second information on reliability. The first information may be determined based on the delay of packet transmission. The lower the delay of the packet transmission, the higher the priority of the packet transmission. Thus, the first information may be determined to be higher. In addition, the second information may be determined based on a required error rate, and may indicate a level of reliability required for each radio bearer or packet. The lower the required error rate of the packet, the higher the level of reliability. Thus, the second information may be determined to be higher. Here, the first information may be referred to as "ProSe priority per packet (PPPP)", and the second information may be referred to as "ProSe reliability per packet (PRPP)".

In step 403, the transmitter determines whether or not to duplicate a packet. In other words, the transmitter determines whether or not to duplicate a packet, based on the parameter determined in step 401. The second information of the parameter indicates information related to whether or not to duplicate a packet, and may be expressed as a value indicating a positive/negative value (e.g., a flag of 1 bit) or a constant value. For example, in the case where the second information is a flag, it may be expressed as 0 or 1 to indicate whether or not to perform packet duplication. Alternatively, if the second information is a constant value, the second information may reflect a packet error loss rate of the QoS. In this case, if the second information is greater than or equal to a specific threshold, the transmitter may determine to perform packet duplication.

In step 405, if the transmitter determines to perform packet duplication, the transmitter duplicates one packet and transmits two or more duplicated packets to a receiver. Two or more duplicated packets may be transmitted through two or more component carriers that perform carrier aggregation (CA). That is, the respective duplicated packets may be transmitted to the receiver through different component carriers.

If the transmitter does not determine to perform the packet duplication, the transmitter transmits one packet to the receiver as normal packet transmission in step 407. In other words, the transmitter transmits one original packet to the receiver without packet duplication.

The transmitter may activate or deactivate duplication of a packet for a sidelink, based on pre-configuration or configuration through messages. Second information for supporting sidelink packet duplication, that is, a PRPP threshold value, may be preconfigured or configured through a message.

Figure 5:
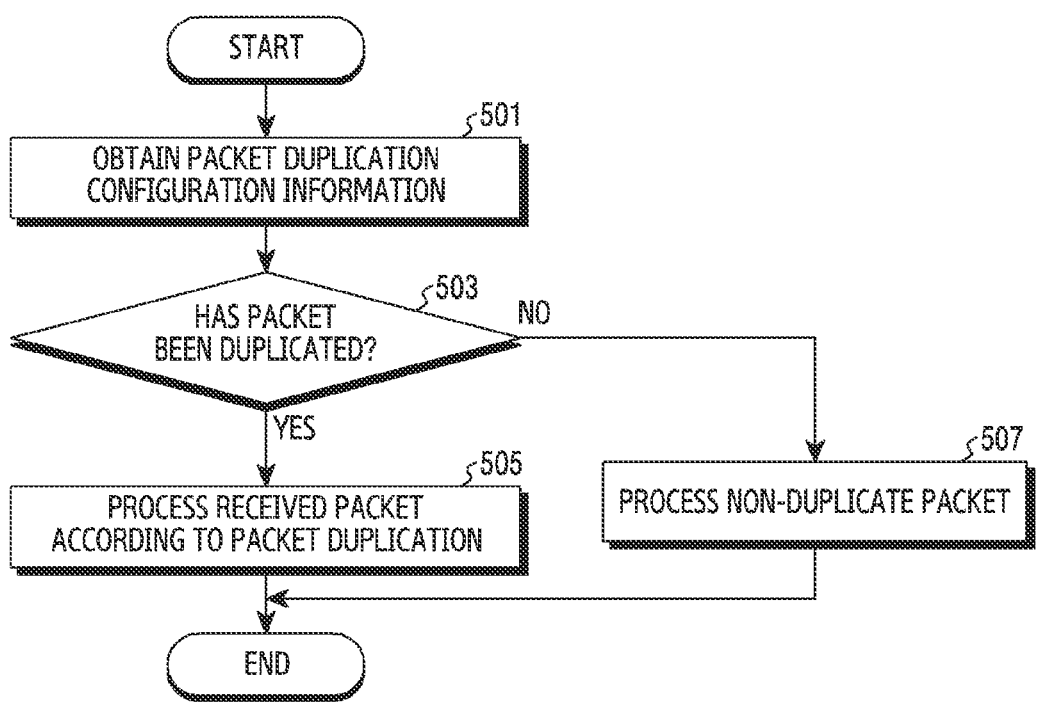
FIG. 5 is a flowchart of a receiver according to various embodiments of the disclosure.

FIG. 5 is a flowchart illustrating the operation of a receiver according to various embodiments of the disclosure. FIG. 5 illustrates an operation method of a terminal (e.g., the terminal 121, the terminal 123, the terminal 125, or the terminal 127) operating as a receiver.

Referring to FIG. 5, in step 501, the receiver obtains packet duplication configuration information. The packet duplication configuration information includes at least one parameter for determining whether or not packet duplication is applied. According to various embodiments, the packet duplication configuration information may be QoS-related information of a service, or may include control information received from a transmitter.

In step 503, the receiver determines whether or not packet duplication is performed. That is, the receiver determines whether or not the transmitter transmits a packet using packet duplication. For example, if the packet duplication configuration information includes QoS-related information of a service, the receiver may determine whether or not the packet duplication is performed based on the QoS-related information according to the same rule as the transmitter. As another example, in the case where the packet duplication configuration information includes control information received from the transmitter, the receiver may determine whether or not packet duplication is performed based on the received control information.

In step 505, the receiver processes packets received according to packet duplication. For example, if the received packet contains data that has not yet been received, the receiver processes the packet. On the other hand, if the received packet includes data that has already been received, the receiver discards the packet. That is, the receiver may process a packet that reaches the receiver early, among the duplicated packets, and may discard a packet that arrives later.

In step 507, the receiver processes a non-duplicate packet. That is, in the case of receiving a non-duplicate packet, the receiver may process the packet according to a normal packet reception procedure, regardless of packet duplication. Thus, the receiver may process the received non-duplicate packet.

Figure 6:
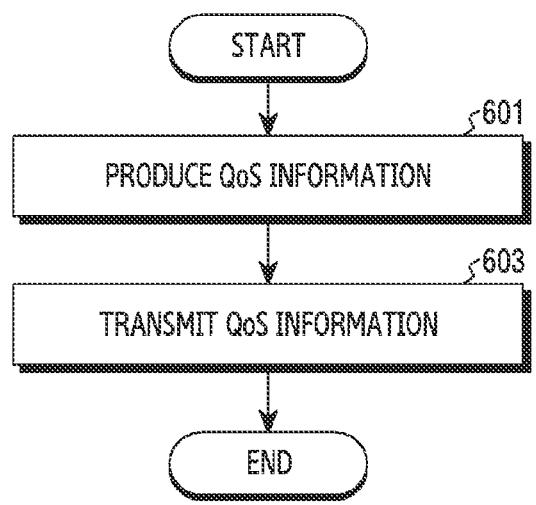
FIG. 6 is a flowchart of a base station according to various embodiments of the disclosure.

FIG. 6 is a flowchart illustrating the operation of a base station according to various embodiments of the disclosure. FIG. 6 illustrates an operation method of the base station 101.

Referring to FIG. 6, in step 601, the base station produces QoS information. In other words, the base station may produce QoS information according to the service of the transmitter or the receiver. The QoS information may be determined based on characteristics of the application to be used in the transmitter or the receiver. For example, the QoS information may be produced in the form of an index representing a predefined QoS class.

In step 603, the base station transmits the QoS information. The QoS information may be transmitted to a corresponding terminal in the process of producing a bearer or flow of the terminal. The QoS information transmitted to the terminal may be used to determine whether or not packet duplication is performed.

As shown in FIG. 6, in the disclosure, a transmitter or a receiver may receive QoS information from a base station through an RRC message. That is, a transmitter or a receiver in the service area of a base station may configure packet duplication in the same manner, based on the QoS information received from the base station through an RRC message.

However, unlike the operation in FIG. 6, the transmitter or the receiver may receive QoS information from a higher layer according to a service type by itself using predetermined information, instead of receiving the QoS information from the base station, thereby processing the same.

As shown in FIG. 6, since the base station performs packet duplication configuration with respect to a transmitter or a receiver in the service area thereof in the same manner through an RRC message, the transmitter and the receiver in the service area of the same base station may transmit and receive duplicated packets, based on the same packet duplication configuration received from the base station. However, i) transmission and reception of duplicated packets between a transmitter and a receiver, which belong to service areas of different base stations, or ii) transmission and reception of duplicated packets in the case where a transmitter performs handover while transmitting the duplicated packets may cause a problem because the transmitter and the receiver may have different packet duplication configurations received from the base stations. In this regard, the disclosure proposes the following embodiments.

i) Transmission and Reception of Duplicated Packets Between a Transmitter and a Receiver within Service Areas of Different Base Stations In this case, the transmitter may determine a packet duplication configuration, based on service type or packet priority information, that is, a PPPP. The transmitter may transmit, to the receiver, information on packet duplication such as a service type, information configured for packet duplication, or duplication information configured in the transmitter. The receiver may receive a duplicate packet transmitted from the transmitter, based on the information on packet duplication determined and transmitted by the transmitter.

ii) The Case where the Transmitter Performs Handover while Transmitting Duplicated Packets Since the packet duplication configuration may be different between base stations, information on the packet duplication configuration of a target base station may be transmitted to the transmitter through handover signaling. For example, packet duplication configuration, i.e., information to determine whether or not to perform packet duplication or information on criteria for determining whether or not to perform packet duplication or the like, may be transmitted to the terminal during the handover procedure. According to an embodiment, the information on the packet duplication configuration may be included in a higher layer (e.g., RRC) message used for processing handover, or may be included in a separate message defined for packet duplication configuration. Accordingly, the terminal may perform different configurations regarding whether or not to perform packet duplication before and after handover.

If the transmitter performs handover without receiving the information on the packet duplication configuration in the target base station while transmitting the duplicate packet, the transmitter may or may not perform packet duplication and transmission according to information preconfigured in the transmitter. According to another embodiment, the transmitter may determine whether or not to perform packet duplication according to the configuration before handover.

A system according to various embodiments may support device-to-device (D2D) communication that performs communication through a direct link between terminals. D2D communication is a communication method in which terminals establish a direct link therebetween and directly transmit and receive voice and data therebetween without passing through the base station. D2D communication may include schemes such as terminal-to-terminal communication, peer-to-peer communication, and the like. In addition, the D2D communication scheme may be applied to machine-to-machine (M2M) communication, machine-type communication (MTC), vehicle-to-everything (V2X), and the like.

D2D communication is considered as a way to solve the load of the base station due to sharply increasing data traffic. For example, according to the D2D communication, unlike the conventional wireless communication system, data may be exchanged between devices without passing through a base station, thereby reducing network overload. In addition, it is possible to expect the effects of reducing the procedure of a base station, reducing the power consumption of the devices participating in D2D, an increase in the data transmission speed, an increase in the capacity of the network, load balancing, expansion of cell coverage, and the like by introducing the D2D communication. In addition, vehicle-to-everything (V2X) communication is under discussion as a form linked to D2D communication. V2X is a concept encompassing V2V communication between vehicle terminals, V2P communication between a vehicle and other types of terminals, and V2I communication between a vehicle and roadside units (RSUs).

Various embodiments related to the execution of packet duplication described above may be performed by a transmitter and a receiver performing V2X communication. In particular, the above-described embodiments may be performed during V2X communication between terminals performing V2X communication using carrier aggregation. Hereinafter, various embodiments related to V2X communication will be described. However, the embodiments described below are not limited to V2X communication, and may be applied to other types of communication.

In the disclosure, the term "X" in V2X (vehicle-to-everything (X)) indicates a pedestrian {communication between a vehicle and a device carried by an individual (e.g., a handheld terminal carried by a pedestrian, a cyclist, a driver, or a passenger)} (V2P), a vehicle (communication between vehicles) (V2V), infrastructure/network (communication between a vehicle and a roadside unit (RSU)/network, for example, RSU is a transportation infrastructure entity (e.g., an entity transmitting speed notifications)) (V2I/N), and the like. In addition, for example, a device possessed by a pedestrian (or person) (related to V2P communication) will be referred to as a "P-terminal", and a device installed in a vehicle (related to V2X communication) will be referred to as a "V-terminal" for the convenience of explanation of the proposed method. Further, for example, the term "entity" in the disclosure may be interpreted as a "P-terminal", a "V-terminal", and/or an "RSU (/network/infrastructure)".

Figure 7:
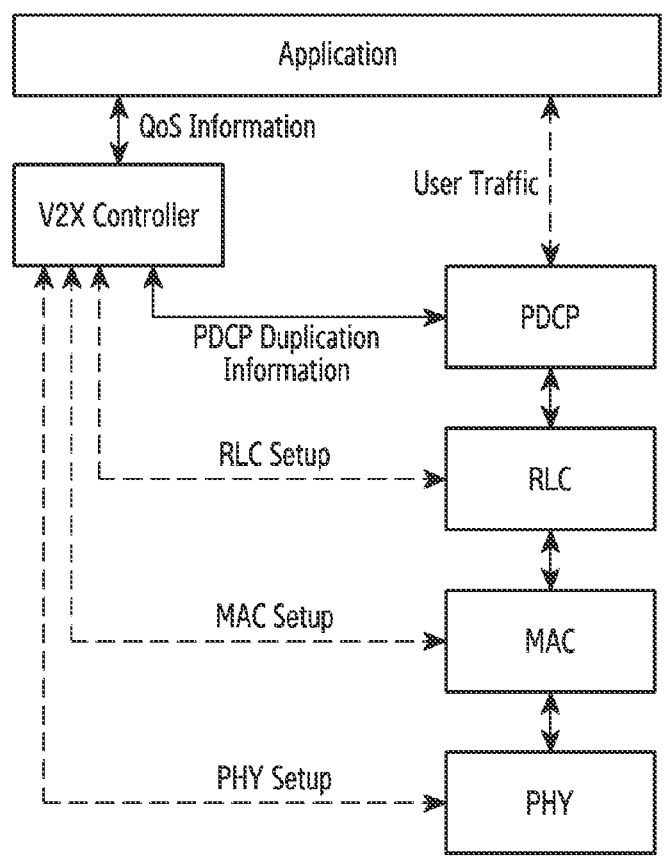
FIG. 7 illustrates a logical hierarchy structure for packet duplication configuration in a packet data convergence protocol (PDCP) layer according to various embodiments of the disclosure.

FIG. 7 illustrates a logical hierarchy structure for packet duplication configuration in a packet data convergence protocol (PDCP) layer according to various embodiments of the disclosure.

In FIG. 7, since a PDCP layer performs packet duplication, information related to packet duplication is transmitted to the PDCP layer, and layers lower than the PDCP layer operate in the same manner as in normal packet transmission. The layer in which to perform packet duplication may be determined by a V2X controller, which will be described later, may be determined by a base station, or may be determined in advance by a terminal.

FIG. 7 may be applied to both a transmitter and a receiver. For example, in the case of a transmitter, information and packets may be transmitted from a higher layer to a lower layer, whereas in the case of a receiver, information and packets may be transmitted from a lower layer to a higher layer.

Referring to FIG. 7, a higher layer, for example, an application layer, may define QoS information preconfigured according to a service type or information on a packet, for example, at least one of a source address, a destination address, or a port number of a packet. As described above with reference to FIG. 4, the QoS information may include at least one of a QCI, a packet delay budget, and a packet error loss rate. The V2X controller may be RRC for an LTE system, or may be a ProSe function for a sidelink. The application layer, which is a higher layer than the V2X controller, may transmit a service type or QoS information, which is used in the application layer, to the V2X controller.

The V2X controller may map parameters according to the QoS information or the service type received from the higher layer. As described above with reference to FIG. 4, the parameter may be defined according to at least one of a PPPP and a PRPP.

The PRPP determines whether or not to duplicate a packet, and may be expressed as a 1-bit flag or a constant value. In the case where the PRPP is a 1-bit flag, it is expressed as 0 or 1 to directly indicate the duplication or non-duplication of packets. For example, in the case where the packet error loss rate of the QoS transmitted from the application layer to the V2X controller is $10^{-6}$, the V2X controller may configure the PRPP as 1, thereby informing the layer in which to perform packet duplication, i.e., the PDCP layer, in the case of FIG. 7, in which packet duplication is to be performed.

In the case where the PRPP is a constant value, the PRPP may reflect the packet error loss rate of the QoS. For example, in the case where the packet error loss rate of the QoS transmitted from the application layer to the V2X controller is $10^{-6}$, the V2X controller may express the PRPP as $10^{-6}$, thereby transmitting the same to the layer to perform packet duplication, i.e., the PDCP layer. The V2X controller may transmit, to the PDCP layer, a PRPP_threshold value, which is a threshold value, along with the PRPP. The PDCP layer may compare the PRPP with the PRPP_threshold received from the V2X controller, and if the PRPP is higher than the PRPP_threshold, may perform packet duplication.

In addition, the V2X controller may provide PDCP duplication information as information for configuring packet duplication to the PDCP layer. The PDCP duplication information may include at least one of, for example, a bearer ID, a PRPP, or a PPPP. Here, the bearer ID may include at least one of a radio bearer ID, a sidelink bearer ID, a Pc5 bearer ID, or a V2X data bearer ID. The PDCP duplication information is a message for configuring a PDCP layer, and may be transmitted from the V2X controller to the PDCP layer using an RRC message or predetermined information.

The PDCP layer may perform PDCP layer configuration, for example, configuration of a radio bearer mapped to the PDCP layer using the information provided from the V2X controller. In the case of performing PDCP packet duplication according thereto, two RLC entities may be mapped to one PDCP entity. In addition, RLC, MAC, and PHY layers, which are lower layers, may perform internal layer configuration by the V2X controller.

Figure 8:
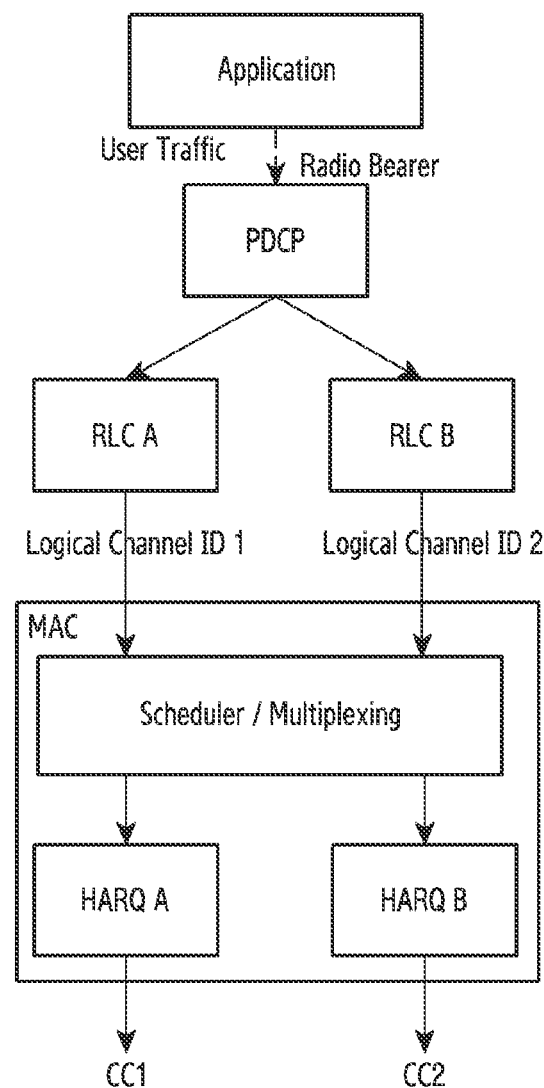
FIG. 8 illustrates the configuration of a transmitter device for mapping two or more radio link control (RLC) entities to one PDCP entity according to various embodiments of the disclosure.

FIG. 8 illustrates the configuration of a transmitter device for mapping two or more radio link control (RLC) entities to one PDCP entity according to various embodiments of the disclosure.

If an application layer, which is a higher layer, transmits data, for example, user traffic, a packet may be transmitted to a PDCP entity through a radio bearer mapped to user traffic.

The V2X controller determines whether or not the radio bearer requires PDCP packet duplication, and transmits the determination to a PDCP entity. With regard to duplication, the PDCP entity duplicates data transmitted through the radio bearer and transmits the same to two or more RLC entities using a radio bearer. Accordingly, a plurality of RLC entities is mapped to one PDCP entity according to the number of duplicated packets. Two or more RLC entities are mapped to a MAC layer through different respective logical channel IDs. Two or more different RLC entities are mapped to two or more different hybrid automatic repeat request (HARQ) entities in the MAC layer. Two or more different HARQ entities transmit respective data corresponding thereto through two or more different component carriers constituting carrier aggregation.

PDCP PDUs duplicated with respect to the same PDCP entity are submitted to two different RLC entities and are associated with two different sidelink logical channels, respectively. PDCP PDUs duplicated with respect to the same PDCP entity may be transmitted only through different sidelink carriers.

Referring to FIG. 8, the data transmitted from the PDCP entity by passing through RLC A via logical channel ID 1 is mapped to HARQ A, and the data transmitted from the PDCP entity by passing through RLC B via logical channel ID 2 is mapped to HARQ B. The data mapped to HARQ A is mapped to component carrier CC1, which is a component carrier in the PHY layer, to then be transmitted to a receiver, and the data mapped to HARQ B is mapped to component carrier CC2, which is a component carrier in the PHY layer, to then be transmitted to a receiver.

Figure 9:
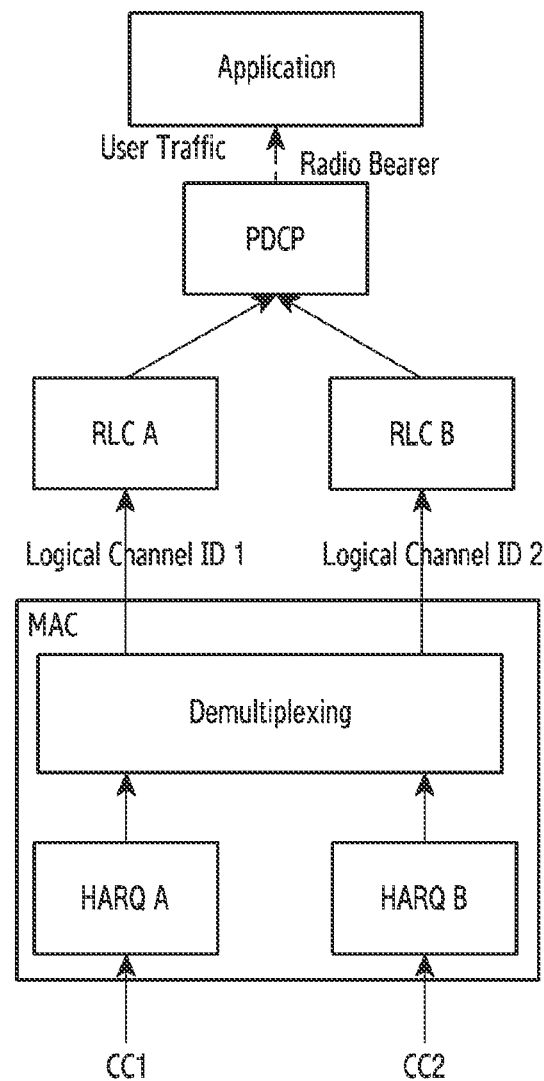
FIG. 9 illustrates the configuration of a receiver device for mapping two or more radio link control (RLC) entities to one PDCP entity according to various embodiments of the disclosure.

FIG. 9 illustrates the configuration of a receiver device for mapping two or more radio link control (RLC) entities to one PDCP entity according to various embodiments of the disclosure.

The receiver device in FIG. 9 has a configuration corresponding to the transmitter device in FIG. 8. Thus, two or more RLC entities are mapped to one PDCP entity.

Data received by the receiver in CC 1 is transmitted to HARQ A, and data received in CC 2 is transmitted to HARQ B. The data transmitted through HARQ A and HARQ B is de-multiplexed in a MAC layer and is then transmitted to RLC A and RLC B through logical channel ID 1 and logical channel ID 2, respectively. Here, the data transmitted to RLC A and RLC B is data duplicated with each other. The data transmitted to two or more RLC entities, RLC A, and RLC B, is transmitted to one PDCP entity.

The PDCP entity receives and processes two or more pieces of duplicate data. Data processing of the PDCP entity is performed according to the order of reception of data from the respective RLC entities. For example, if data is received first through RLC A and then duplicate data is received through RLC B, the data received through RLC A is processed and transmitted to a higher layer, and the data received through RLC B is discarded.

FIG. 10 illustrates parameters available in an LTE system among quality of service (QoS) parameters according to various embodiments of the disclosure. The parameters in FIG. are QoS parameters currently used in the LTE system.

The parameters shown in FIG. 10 constitute QoS information, and are used to produce a PRPP. Accordingly, the parameter in FIG. 10 is used to determine whether or not to duplicate a packet through a PRPP. QoS information is mapped to QCI and used in an access stratum (AS) layer. Here, the QCI is determined based on a resource type, a priority level, a packet delay budget, and a packet error loss rate.

Referring to FIG. 10, the packet error loss rate in the case of a real time gaming as an example service is $10^{-3}$, whereas the packet error loss rate in the case of a V2X message is $10^{-2}$. Since the packet error loss rate in the real time gaming is lower when comparing the two services, packet duplication may be performed on the real time gaming.

FIG. 11 illustrates parameters available in a 5G system, among QoS parameters, according to various embodiments of the disclosure. The parameters in FIG. 11 are QoS parameters currently used in a 5G new radio (NR) system.

Like the parameters in FIG. 10, the parameters in FIG. 11 also constitute QoS information and are used in producing a PRPP. The QoS information is mapped to a 5G QoS identifier (5QI) and used in an AS layer. Here, SCI is determined by a resource type, a priority level, a packet delay budget, a packet error loss rate, and a default averaging window.

Referring to FIG. 11, the packet error loss rate in the case of a conversational video as an example of served content is $10^{-3}$, whereas the packet error loss rate in the case of a non-conversational video is $10^{-6}$. Since the packet error loss rate of the non-conversational video is lower when comparing the two services, packet duplication may be performed on the non-conversational video.

Figure 12:
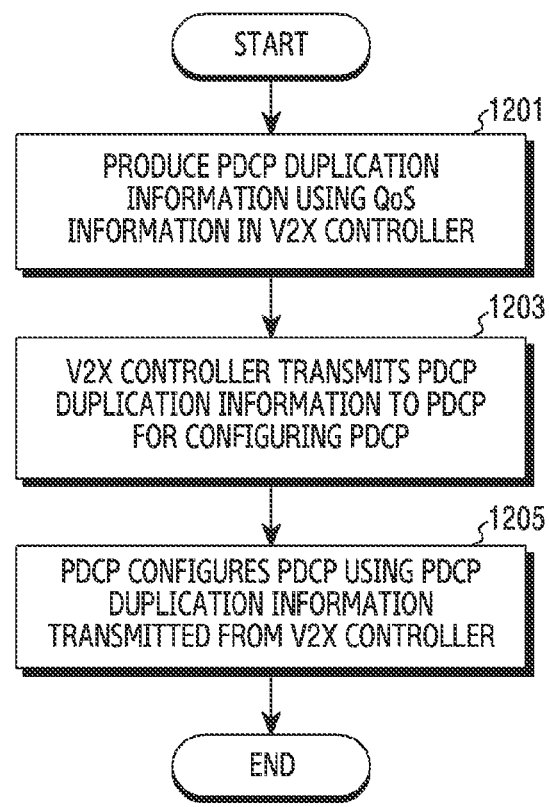
FIG. 12 is a flowchart illustrating an operation of configuring PDCP duplication in a transmitter/receiver according to various embodiments of the disclosure.

FIG. 12 is a flowchart illustrating an operation of configuring PDCP duplication in a transmitter/receiver according to various embodiments of the disclosure.

A V2X controller may produce PDCP duplication information using QoS information received from a higher application layer, for example, a packet error loss rate or the like (1201). The V2X controller may provide a PDCP layer with PDCP duplication information for configuring packet duplication (1203). The PDCP duplication information may include, for example, at least one of a bearer ID, a PRPP, or a PPPP. Here, the bearer ID may include at least one of a radio bearer ID, a sidelink bearer ID, a PC5 bearer ID, and a V2X data bearer ID.

As described above with reference to FIG. 7, the PRPP may be represented by a flag of 1 bit or a constant value. In the case where the PRPP is a 1-bit flag, it directly indicates the duplication or non-duplication of packets. In addition, in the case where the PRPP is a constant value, the V2X controller may transmit, to the PDCP layer, a PRPP_threshold value, which is a threshold value, along with the PRPP. The PDCP layer may compare the PRPP with the PRPP_threshold received from the V2X controller, and if the PRPP is higher than the PRPP_threshold, may perform packet duplication.

In addition, the V2X controller may provide PDCP duplication information for configuring packet duplication to the PDCP layer.

Furthermore, the PDCP layer may configure the PDCP layer using information provided from the V2X controller (1205). For example, if packet duplication is determined through PDCP duplication information, two RLC entities are mapped to one PDCP entity. Therefore, two or more logical channels may be mapped to each radio bearer ID.

Figure 13:
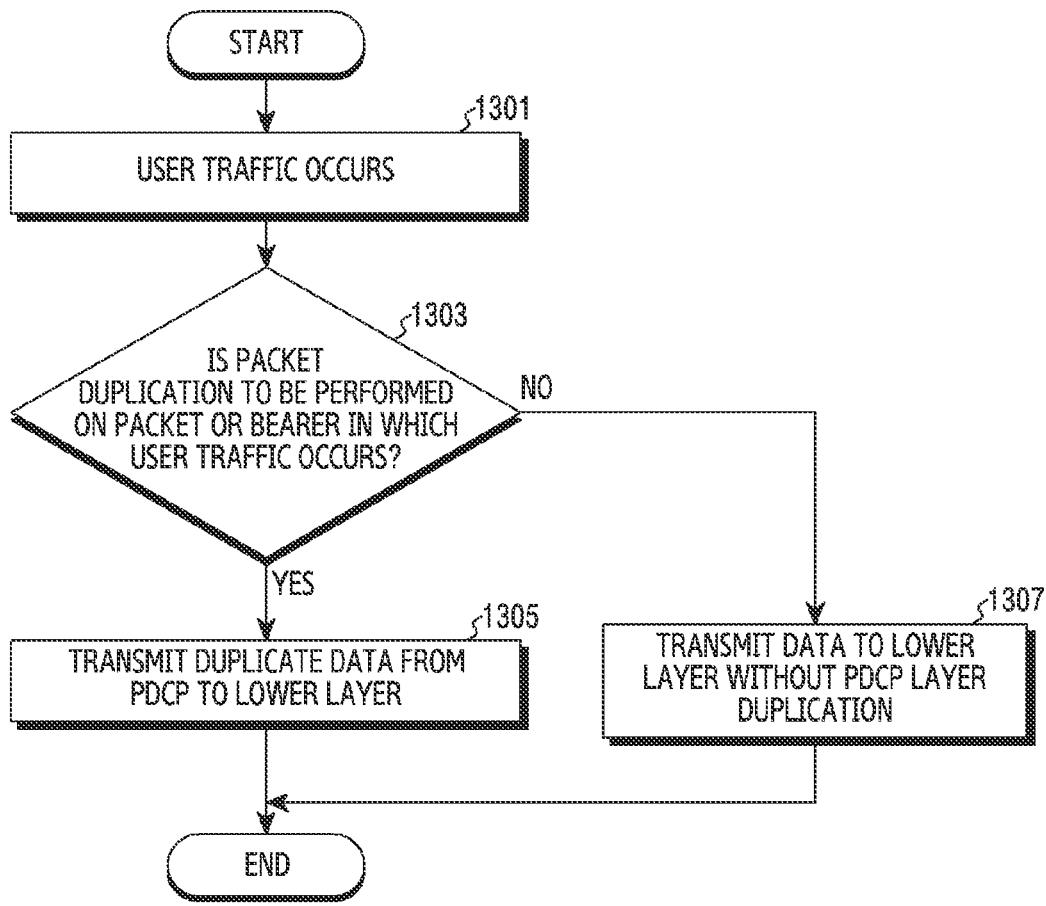
FIG. 13 is a flowchart illustrating an operation of performing duplication in a PDCP layer after user traffic occurs in a transmitter according to various embodiments of the disclosure.

FIG. 13 is a flowchart illustrating an operation of performing duplication in a PDCP layer after user traffic occurs in a transmitter according to various embodiments of the disclosure.

As described above, the application layer, which is a higher layer, may transmit user traffic as data to the PDCP layer. The PDCP layer receives a packet in which user traffic occurs from a higher layer or activates a radio bearer (1301). The PDCP entity may identify the packet produced in the higher layer or the radio bearer activated by the higher layer, and may then identify whether or not to perform packet duplication (1303). Here, the radio bearer is preconfigured by a V2X controller.

In the case where the PDCP entity performs packet duplication, one PDCP entity transmits the same data to two or more RLC entities (1305). On the other hand, in the case where the PDCP entity does not perform packet duplication, one PDCP entity is mapped to one RLC entity and transmits data thereto (1307).

Figure 14:
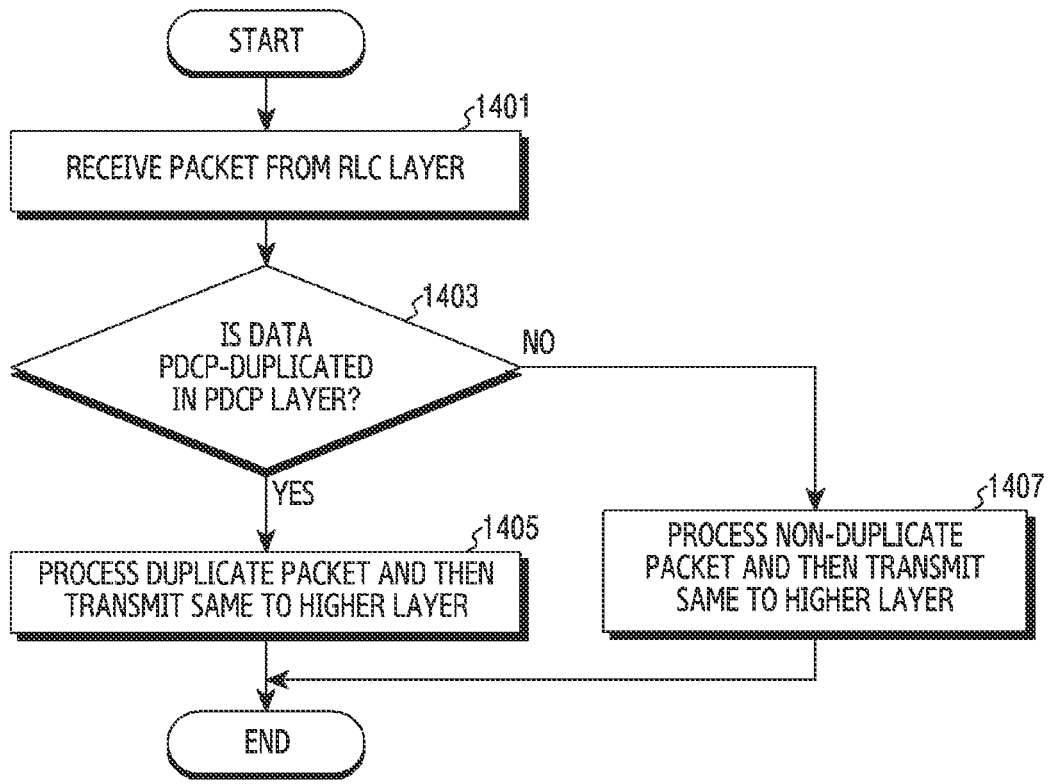
FIG. 14 is a flowchart illustrating an operation of performing duplication in a PDCP layer after user traffic occurs in a receiver according to various embodiments of the disclosure.

FIG. 14 is a flowchart illustrating an operation of performing duplication in a PDCP layer after user traffic occurs in a receiver according to various embodiments of the disclosure.

The operation flow of the receiver in FIG. 14 corresponds to the operation flow of the transmitter in FIG. 13.

The PDCP layer receives data from a lower layer, e.g., an RLC layer (1401).

After checking a logical channel received from the RLC, the PDCP may identify whether or not PDCP packet duplication has been performed on the packet (1403). Here, the configuration of a duplicate logical channel or non-duplicate logical channel is performed in advance by a V2X controller.

If a packet on which PDCP packet duplication has been performed is received, the PDCP processes the duplicate packet and transmits the same to a higher layer (1405). For example, reordering may be performed using the duplicate packet. On the other hand, if a packet on which PDCP packet duplication has not been performed is received, the PDCP may process the non-duplicate packet, and may then transmit the same to a higher layer, for example, an application layer (1407).

In order to receive V2X sidelink communication, packet duplication detection is performed in the PDCP layer in the receiver. The reordering function is also supported in the PDCP layer, and a method of configuring a reordering timer in the PDCP layer depends on the implementation of the receiver. There is a specific logical channel identity applied to a sidelink logical channel dedicated to sidelink packet duplication.

Figure 15:
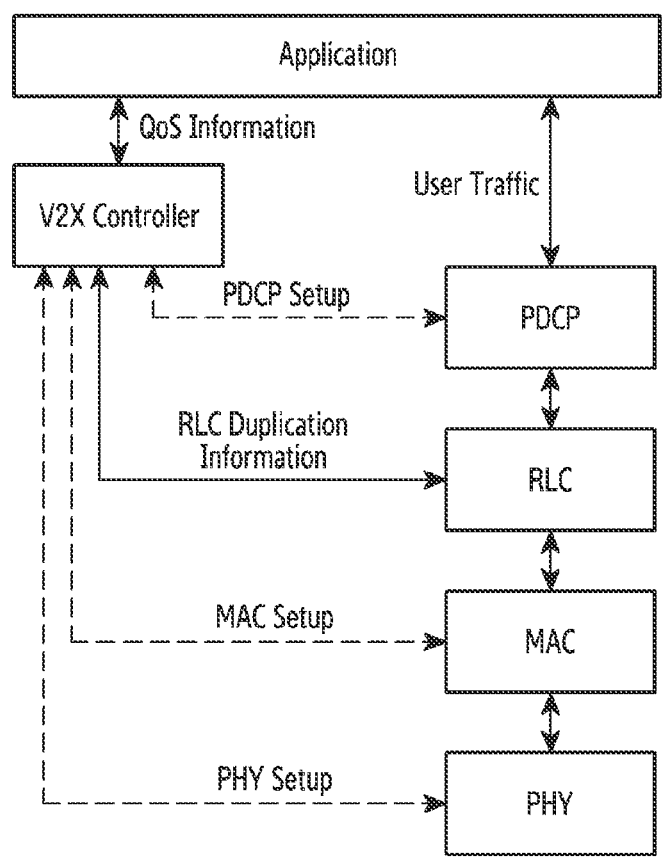
FIG. 15 illustrates a logical hierarchy structure for configuring packet duplication in an RLC layer according to various embodiments of the disclosure.

FIG. 15 illustrates a logical hierarchy structure for configuring packet duplication in an RLC layer according to various embodiments of the disclosure.

A higher layer, for example, an application layer, may define QoS information preconfigured according to a service type or information on a packet, for example, at least one of a source address, a destination address, or a port number of a packet. The QoS information may include at least one of a QCI, a packet delay budget, and a packet error loss rate, and may be mapped to the parameters in FIG. 10 or 11. The V2X controller may be RRC for an LTE system, or may be a ProSe function for a sidelink. The application layer, which is a higher layer than the V2X controller, may transmit a service type or QoS information, which is used in the application layer, to the V2X controller.

The V2X controller may map parameters according to the QoS information or the service type received from the higher layer. As described above with reference to FIG. 4, the parameter may be defined according to at least one of a PPPP or a PRPP, or a V-UM (unacknowledged mode) RLC window timer or a logical channel ID value, which will be described later.

The PRPP determines whether or not to duplicate a packet, and may be expressed as a 1-bit flag or a constant value. In the case where the PRPP is a 1-bit flag, it directly indicates the duplication or non-duplication of packets. In the case where the PRPP is a constant value, the PRPP may reflect a packet error loss rate. In the case where the packet error loss rate of the QoS transmitted from the application layer to the V2X controller is 10', the V2X controller may express the PRPP as 10', thereby transmitting the same. In the case where the PRPP is a constant value, the V2X controller may transmit, to the PDCP layer, a PRPP_threshold value, which is a threshold value, along with the PRPP. The PDCP layer may compare the PRPP with the PRPP_threshold received from the V2X controller, and if the PRPP is higher than the PRPP_threshold, may perform packet duplication.

Since V2X is based on broadcast, it is impossible to introduce acknowledgment (Ack) feedback. Therefore, V2X can use only a UM mode, instead of an acknowledgement mode (AM) mode including Ack, in the RLC retransmission method. The disclosure proposes a method of operating a window as if it were in an AM mode even though it is in a UM mode. Specifically, the window in the AM mode moves based on the packet having the earliest number, among the packets that have not been received. However, in the case of using a window in the AM mode in V2X, the window may not move continuously because Ack feedback is not received. Therefore, the disclosure proposes that a timer is defined and that if the timer expires, the window is forcibly moved. The expiration time of the timer may be configured according to a PPPP in consideration of the delay. Therefore, if the priority is high, the timer may be configured to be short, and the window may be moved quickly. In the disclosure, a new timer in the UM for V2X is defined as a "V_UM RLC window timer". Also, a window operating as if it were in an AM mode according to the V_UM RLC window timer is defined as a "V_UM RLC window". Furthermore, a new RLC UM operation using a V_UM RLC window timer for V2X is defined as a "V_UM RLC operation".

As described above, the PPPP may be provided as a parameter for configuring the V_UM RLC window timer. The value of the timer may be configured according to an index value of the PPPP. For example, if the PPPP index is 1, the V_UM RLC window timer may be configured as 100 ms. If the PPPP index is 2, the V_UM RLC window timer may be configured as 200 ms.

The V2X controller may provide RLC duplication information for configuring packet duplication to the RLC. The RLC duplication information may include, for example, at least one of a bearer ID, a PRPP, a PPPP, an LCID, or V_UM RLC window timer. Here, the bearer ID may include at least one of a radio bearer ID, a sidelink bearer ID, a Pc5 bearer ID, or a V2X data bearer ID. The RLC duplication information is a message for configuring an RLC layer, and may be transmitted from the V2X controller to an RLC layer using an RRC message or predetermined information.

The RLC layer may perform configuration between a PDCP layer and an RLC layer using the RLC duplication information provided by the V2X controller. For example, in the case where RLC packet duplication is performed using a method determined by a V2X controller, determined by a base station, or determined by a terminal in advance, two or more logical channel IDs may be mapped to one RLC entity. Accordingly, the PDCP, MAC, and PHY layers may be configured by a method of processing a packet in an LTE system as an example of configuration.

Figure 16:
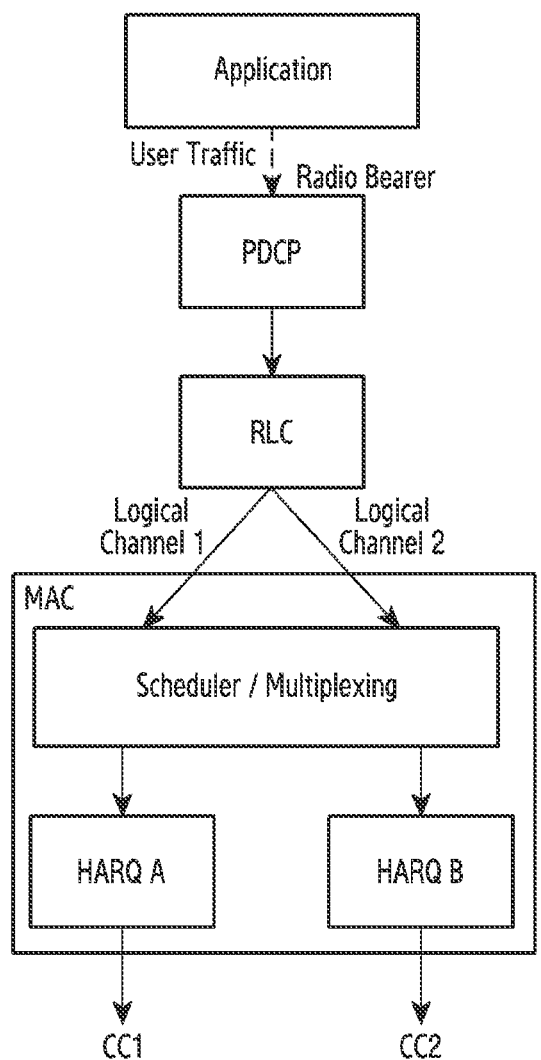
FIG. 16 illustrates the configuration of a transmitter device that maps two or more logical channel identifiers (IDs) to one RRC entity according to various embodiments of the disclosure.

FIG. 16 illustrates the configuration of a transmitter device that maps two or more logical channel IDs to one RRC entity according to various embodiments of the disclosure.

If an application layer, which is a higher layer, transmits data, for example, user traffic, a packet may be transmitted to the PDCP through a radio bearer mapped to the user traffic. The PDCP layer transmits the packet to an RLC entity. The RLC entity may perform the V_UM RLC operation defined in FIG. 15. A detailed description of the V_UM RLC operation will be made later with reference to FIG. 18.

In the RLC layer, it is preconfigured by the V2X controller whether or not packet duplication of the data from the PDCP is to be performed. Accordingly, the data received through a corresponding to radio bearer is mapped to two or more logical channel IDs through the RLC and is transmitted to the MAC layer.

Two or more different logical channel IDs are mapped to two or more different HARQs in the MAC layer. Two or more different HARQ entities transmit respective corresponding data through two or more different component carriers constituting carrier aggregation. For example, data received through logical channel 1 is mapped to HARQ A, and data received through logical channel 2 is mapped to HARQ B. Here, HARQ A is mapped to CC 1 to then be transmitted in the PHY layer, and HARQ B is mapped to CC 2 to then be transmitted. CC 1 and CC 2 are component carriers that perform carrier aggregation together.

Figure 17:
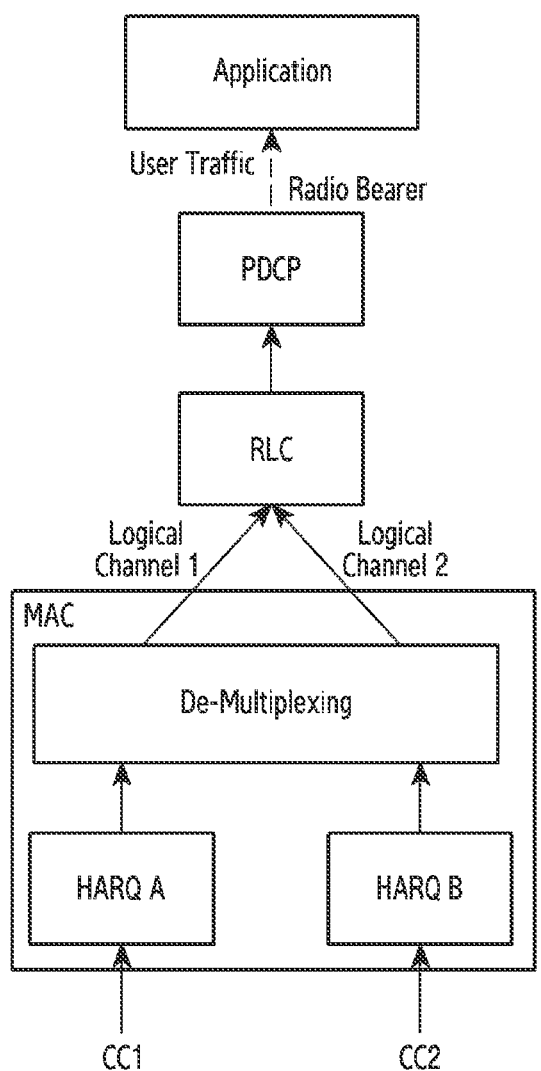
FIG. 17 illustrates the configuration of a receiver device that maps two or more logical channel IDs to one RRC entity according to various embodiments of the disclosure.

FIG. 17 illustrates the configuration of a receiver device that maps two or more logical channel IDs to one RRC entity according to various embodiments of the disclosure.

The receiver device in FIG. 17 has a configuration corresponding to the transmitter device in FIG. 16. Thus, two or more logical channels are mapped to one RLC entity.

Data received by the receiver in CC 1 is transmitted to HARQ A, and data received in CC 2 is transmitted to HARQ B. The data transmitted through HARQ A and HARQ B is de-multiplexed in a MAC layer and is then transmitted to one RLC through logical channel ID 1 and logical channel ID 2. Two or more pieces of duplicate data received through one RLC are transmitted to the PDCP entity via reordering. The data received by the PDCP entity is processed by a higher method and is then transmitted to the higher layer.

Figure 18:
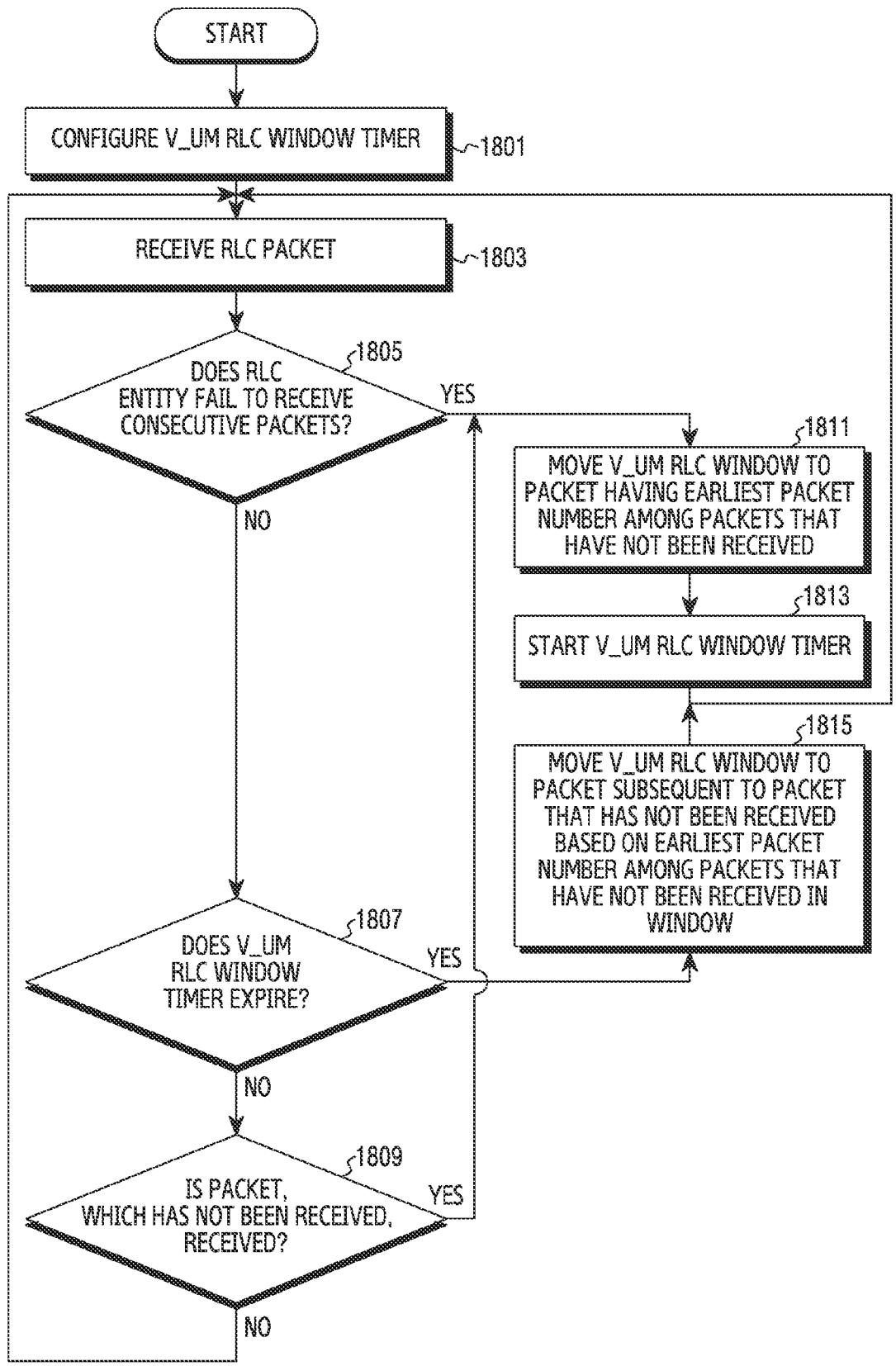
FIG. 18 is a flowchart illustrating an operation of operating an RLC window and an RLC window timer in a receiver device during RLC duplication according to various embodiments of the disclosure.

FIG. 18 is a flowchart illustrating an operation of operating an RLC window and an RLC window timer in a receiver device during RLC duplication according to various embodiments of the disclosure.

An RLC entity may configure a V_UM RLC window timer according to information received through a V2X controller (1801).

According to an embodiment, if the RLC entity receives a PPPP by the V2X controller, the PPPP may indicate a priority index, and may map the PPPP index to a value of the V_UM RLC window timer. For example, if the PPPP index is 1, the V_UM RLC window timer may be configured as 100 ms, and if the PPPP index is 2, the V_UM RLC window timer may be configured as 200 ms.

As another embodiment, if the RLC entity receives the V_UM RLC window timer determined by the V2X controller, the RLC entity may apply the value of the received V_UM RLC window timer as it is.

The RLC entity receives the packet (1803), and may operate as follows depending on the reception state of the packet.

i) In the Case where the RLC Entity Fails to Receive Consecutive Packets (1805)

The V_UM RLC window is moved to the packet having the earliest packet number, among the packets that have not been received (1811), the V_UM RLC window timer is started (1813), and the RLC packet is received again.

ii) In the Case where the RLC Entity Fails to Receive Consecutive Packets and the V_UM RLC Window Timer Expires (1807)

The V_UM RLC window is moved to the packet subsequent to the packet that has not been received based on the earliest packet number, among the packets that have not been received (1815), the V_UM RLC window timer is started (1813), and the RLC packet is received again.

iii) In the Case where the RLC Entity Fails to Receive Consecutive Packets, and Receives a Packet that is not Received Before the V_UM RLC Window Timer Expires (1809) (e.g., in the Case of Receiving a Duplicate of a Packet that has not been Received).

The V_UM RLC window is moved to the packet having the earliest packet number, among the packets that have not been received (1811), the V_UM RLC window timer is started (1813), and the RLC packet is received again.

Figure 19:
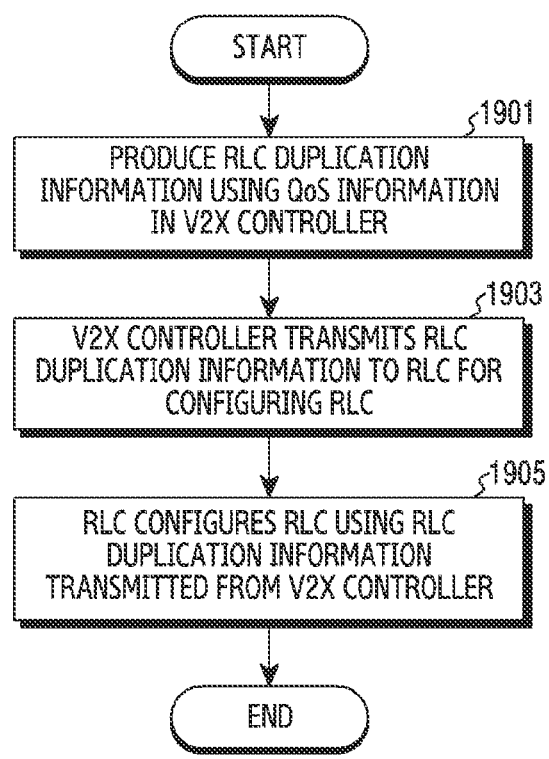
FIG. 19 is a flowchart illustrating an operation of configuring RLC duplication in a transmitter/receiver according to various embodiments of the disclosure.

FIG. 19 is a flowchart illustrating an operation of configuring RLC duplication in a transmitter/receiver according to various embodiments of the disclosure.

A V2X controller may produce RLC duplication information using QoS information received from a higher application layer, for example, a packet error loss rate or the like (1901). The V2X controller may provide a RLC layer with RLC duplication information for configuring packet duplication (1903). The RLC duplication information may include, for example, at least one of a bearer ID, a PRPP, a PPPP, or a V_UM window timer. Here, the bearer ID may include at least one of a radio bearer ID, a sidelink bearer ID, a PC5 bearer ID, or a V2X data bearer ID.

The PRPP may be represented by a flag of 1 bit or a constant value. In the case where the PRPP is a 1-bit flag, it directly indicates the duplication or non-duplication of packets. In addition, in the case where the PRPP is a constant value, the PRPP may reflect a packet error loss rate. In the case where the packet error loss rate of the QoS transmitted from the application layer to the V2X controller is $10^{-6}$, the V2X controller may express the PRPP as $10^4$, thereby transmitting the same. In the case where the PRPP is a constant value, the V2X controller may transmit, to the PDCP layer, a PRPP_threshold value, which is a threshold value, along with the PRPP. The PDCP layer may compare the PRPP with the PRPP_threshold received from the V2X controller, and if the PRPP is higher than the PRPP_threshold, may perform packet duplication.

The PPPP may be represented as an index, or may be represented as a value of the V_UM RLC window timer corresponding to the PPPP, instead of the PPPP.

The V2X controller may provide RLC duplication information for configuring packet duplication in the RLC layer.

Furthermore, the RLC layer may configure the RLC layer using information provided from the V2X controller (1905). For example, if packet duplication is determined through RLC duplication information, two or more logical channel IDs may be mapped to one RLC entity.

Figure 20:
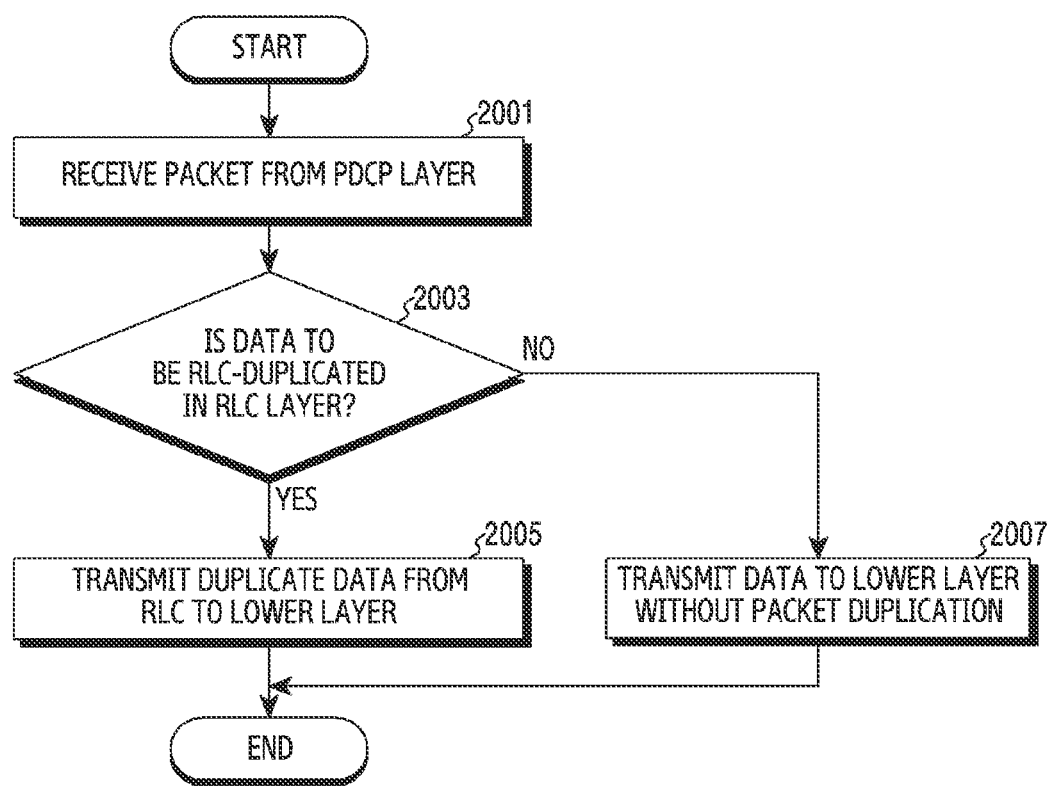
FIG. 20 is a flowchart illustrating an operation of processing a duplicate packet in an RLC layer after user traffic occurs in a transmitter according to various embodiments of the disclosure.

FIG. 20 is a flowchart illustrating an operation of processing a duplicate packet in an RLC layer after user traffic occurs in a transmitter according to various embodiments of the disclosure.

The RLC layer receives a packet from a higher layer, for example, a PDCP layer (2001). The RLC layer may identify an internal radio bearer from the PDCP, and may identify whether or not to perform RLC duplication (2003). Here, the internal radio bearer may be preconfigured by the V2X controller.

In the case where the RLC entity performs packet duplication, one RLC entity transmits the same data through two or more logical channel IDs (2005). On the other hand, if the RLC entity does not perform packet duplication, one RLC entity is mapped to one logical channel to then transmit data (2007).

Figure 21:
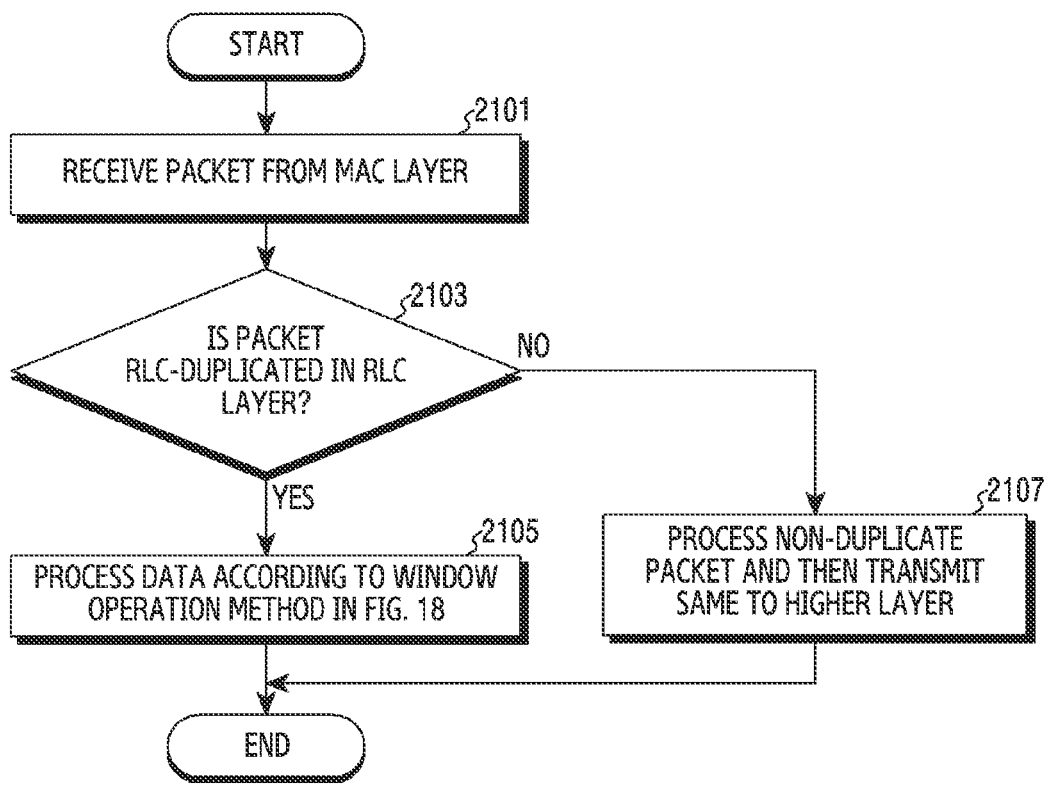
FIG. 21 is a flowchart illustrating an operation of processing a duplicated packet in an RLC layer after user traffic occurs in a receiver according to various embodiments of the disclosure.

FIG. 21 is a flowchart illustrating an operation of processing a duplicated packet in an RLC layer after user traffic occurs in a receiver according to various embodiments of the disclosure.

The operation flow of the receiver in FIG. 21 corresponds to the operation flow of the transmitter in FIG. 20.

The RLC layer receives data from a lower layer, e.g., a MAC layer (2101).

After checking a logical channel received from the MAC, the RLC may identify whether or not RLC packet duplication has been performed on the packet (2103). Here, the configuration of a duplicate logical channel or non-duplicate logical channel is performed in advance by a V2X controller.

If a packet on which RLC packet duplication has been performed is received, the RLC may process the data according to the V_UM RLC window operation method in FIG. 18 (2105). Specifically, the packets may be reordered according to the V_UM RLC window operation method in FIG. 18. On the other hand, if a packet on which RLC packet duplication has not been performed is received, the RLC may process the non-duplicate packet, and may then transmit the same to a higher layer, for example, the PDCP layer (2107).

Figure 22:
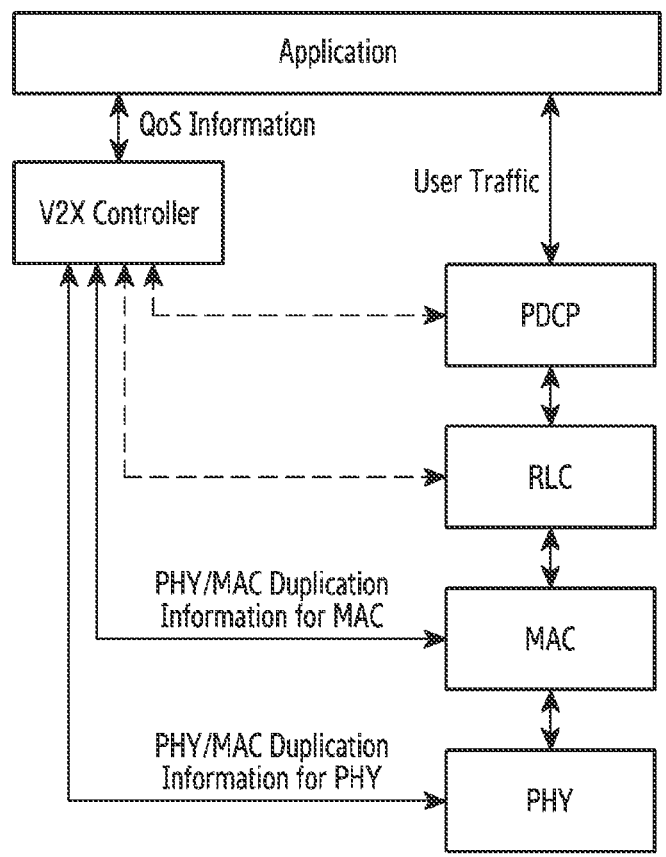
FIG. 22 illustrates a logical hierarchy structure for configuring packet duplication in a PHY/MAC layer according to various embodiments of the disclosure.

FIG. 22 illustrates a logical hierarchy structure for configuring packet duplication in a PHY/MAC layer according to various embodiments of the disclosure.

Unlike the PDCP layer or the RLC layer above, in the case of a PHY/MAC layer, since there are two component carriers with respect to one HARQ, it is impossible to perform duplication using only the MAC layer, without using the PHY layer. Therefore, both the PHY layer and the MAC layer perform duplication.

A higher layer, for example, an application layer, may define QoS information preconfigured according to a service type or information on a packet, for example, at least one of a source address, a destination address, or a port number of a packet. The QoS information may include at least one of a QCI, a packet delay budget, and a packet error loss rate, and may be mapped to the parameters in FIG. 10 or 11. The V2X controller may be RRC for an LTE system, or may be a ProSe function for a sidelink. The application layer, which is a higher layer than the V2X controller, may transmit a service type or QoS information, which is used in the application layer, to the V2X controller.

The V2X controller may map parameters according to the QoS information or the service type received from the higher layer. The parameter may be defined based on a PPPP or a PRPP.

The PRPP determines whether or not to duplicate a packet, and may be expressed as a 1-bit flag or a constant value. In the case where the PRPP is a 1-bit flag, it directly indicates the duplication or non-duplication of packets. In the case where the PRPP is a constant value, the PRPP may reflect a packet error loss rate. In the case where the packet error loss rate of the QoS transmitted from the application layer to the V2X controller is $10^{-6}$, the V2X controller may express the PRPP as $10^{-6}$, thereby transmitting the same. In the case where the PRPP is a constant value, the V2X controller may transmit, to the PDCP layer, a PRPP_threshold value, which is a threshold value, along with the PRPP. The PDCP layer may compare the PRPP with the PRPP_threshold received from the V2X controller, and if the PRPP is higher than the PRPP_threshold, may perform packet duplication.

The V2X controller may provide PHY/MAC duplication information for MAC to configure packet duplication to the MAC. The PHY/MAC duplication information for MAC may include, for example, at least one of a logical channel ID or a HARQ ID. The PHY/MAC duplication information for MAC is a message for configuring the MAC, and may be transmitted from the V2X controller to the MAC layer using an RRC message or predetermined information.

The MAC layer may perform MAC configuration using the PHY/MAC duplication information for MAC provided by the V2X controller. For example, in the case where PHY/MAC packet duplication is performed using a method determined by a V2X controller, determined by a base station, or determined in advance by a terminal, one HARQ ID may be mapped to one logical channel ID in the MAC entity.

The V2X controller may provide PHY/MAC duplication information for PHY to configure packet duplication to the PHY. The PHY/MAC duplication information for PHY may include, for example, at least one of a HARQ ID or a component carrier ID. The PHY/MAC duplication information for PHY is a message for configuring the PHY, and may be transmitted from the V2X controller to the PHY layer using an RRC message or predetermined information.

The PHY layer may perform PHY configuration using the PHY/MAC duplication information for PHY provided by the V2X controller. For example, in the case where PHY/MAC packet duplication is performed using a method determined by a V2X controller, determined by a base station, or determined in advance by a terminal, one HARQ ID may be mapped to two or more component carriers in the PHY layer.

Figure 23:
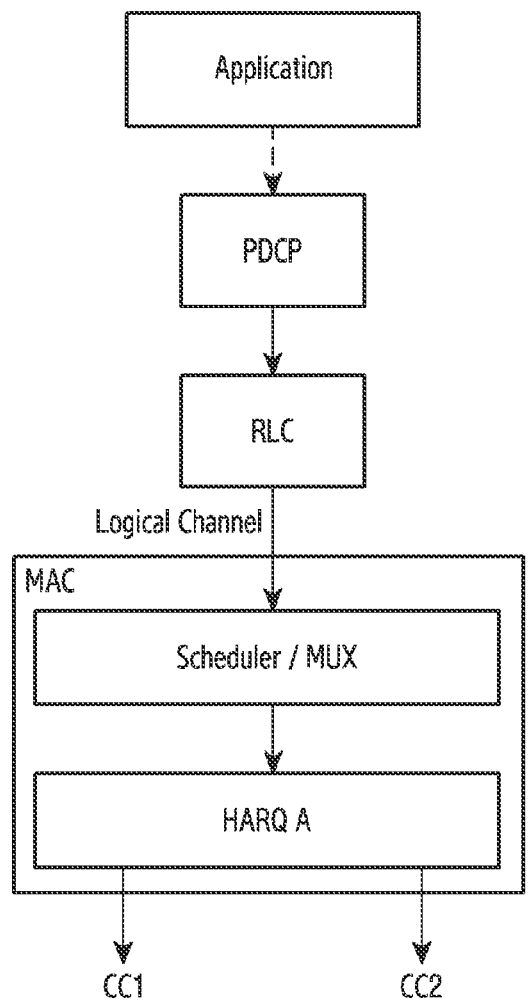
FIG. 23 illustrates the structure of a transmitter device that maps two or more component carriers to one hybrid automatic repeat request (HARQ) entity according to various embodiments of the disclosure.

FIG. 23 illustrates the structure of a transmitter device that maps two or more component carriers to one hybrid automatic repeat request (HARQ) entity according to various embodiments of the disclosure.

If an application layer, which is a higher layer, transmits data, for example, user traffic, a packet may be transmitted to the PDCP through a radio bearer mapped to the user traffic. The PDCP layer transmits the packet to an RLC entity. The RLC entity is mapped to one HARQ in the MAC layer using a logical channel. For example, the data received in the RLC is mapped to HARQ. The HARQ is mapped to two component carriers CC 1 and CC 2 in the PHY layer and is then be transmitted. CC 1 and CC 2 are component carriers that perform carrier aggregation together. The HARQ and the component carriers are configured by the V2X controller.

Figure 24:
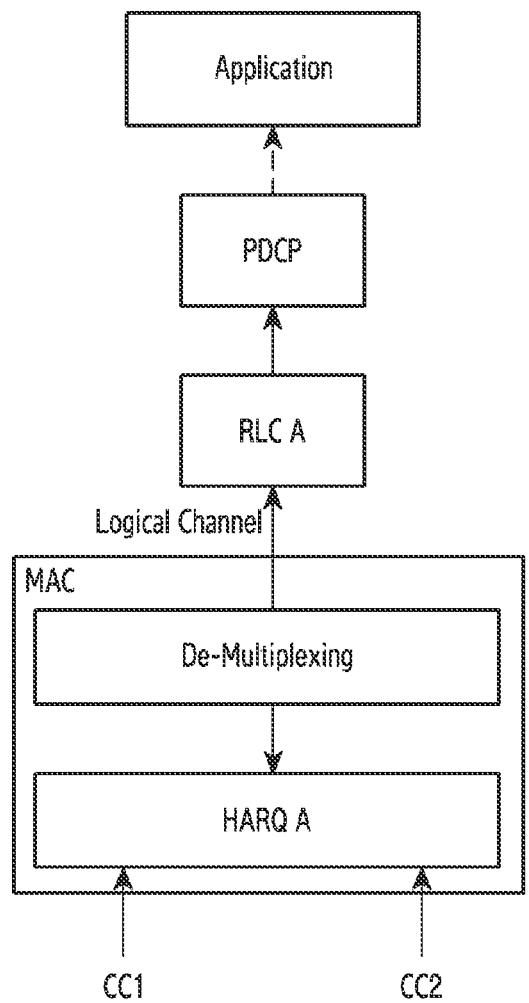
FIG. 24 illustrates the structure of a receiver device that maps two or more component carriers to one hybrid automatic repeat request (HARQ) entity according to various embodiments of the disclosure.

FIG. 24 illustrates the structure of a receiver device that maps two or more component carriers to one hybrid automatic repeat request (HARQ) entity according to various embodiments of the disclosure.

The receiver device in FIG. 24 has a configuration corresponding to the transmitter device in FIG. 23. Thus, two or more component carriers are mapped to one HARQ entity.

If the receiver receives data from a lower layer, for example, a PHY layer, a packet is transmitted to the HARQ mapped to a component carrier. The HARQ is mapped to two component carriers CC 1 and CC 2 in the PHY layer to enable HARQ combination. The data received through the HARQ is transmitted to a higher layer.

Figure 25:
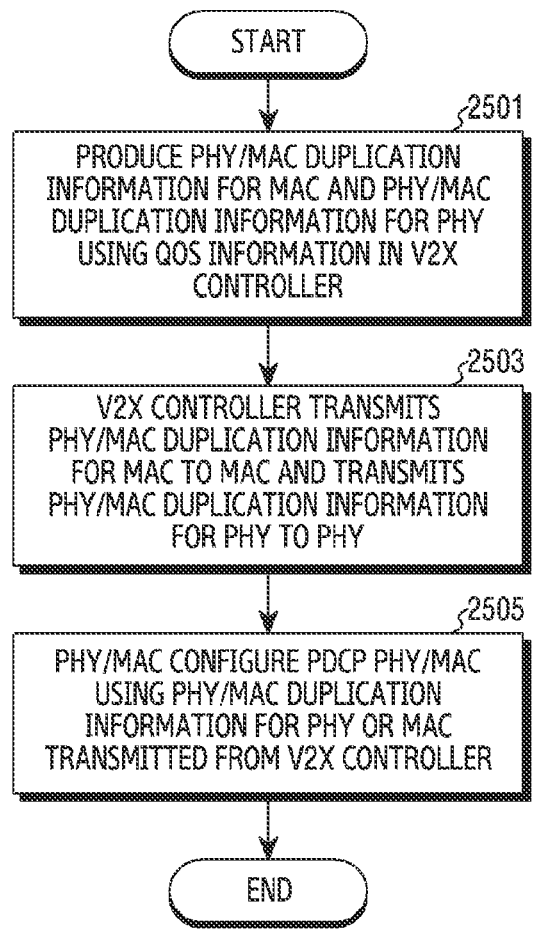
FIG. 25 is a flowchart illustrating an operation of configuring PHY/MAC duplication in a transmitter/receiver according to various embodiments of the disclosure.

FIG. 25 is a flowchart illustrating an operation of configuring PHY/MAC duplication in a transmitter/receiver according to various embodiments of the disclosure.

A V2X controller may produce PHY/MAC duplication information for MAC and PHY/MAC duplication information for PHY using QoS information received from a higher application layer, for example, a packet error loss rate or the like (2501). The V2X controller may provide a MAC layer and a PHY layer with PHY/MAC duplication information for MAC and PHY/MAC duplication information for PHY, respectively (2503). The PHY/MAC duplication information for MAC may include, for example, at least one of a logical channel ID or a HARQ ID. The PHY/MAC duplication information for PHY may include, for example, at least one of a HARQ ID or one or more component carrier IDs.

The PRPP may be represented by a flag of 1 bit or a constant value. In the case where the PRPP is a 1-bit flag, it directly indicates the duplication or non-duplication of packets. In addition, in the case where the PRPP is a constant value, the PRPP may reflect a packet error loss rate. In the case where the packet error loss rate of the QoS transmitted from the application layer to the V2X controller is $10^{-6}$, the V2X controller may express the PRPP as $10^{-6}$, thereby transmitting the same. In the case where the PRPP is a constant value, the V2X controller may transmit, to the PDCP layer, a PRPP_threshold value, which is a threshold value, along with the PRPP. The PDCP layer may compare the PRPP with the PRPP_threshold received from the V2X controller, and if the PRPP is higher than the PRPP_threshold, may perform packet duplication.

The PPPP may be represented as an index, or may be represented as a value of a timer corresponding to the PPPP, instead of the PPPP.

The V2X controller may provide PHY/MAC duplication information for MAC to configure packet duplication to the MAC layer.

Furthermore, the MAC layer may map a logical channel to a HARQ ID using PHY/MAC duplication information for MAC provided by the V2X controller (2505). For example, if packet duplication is determined through the PHY/MAC duplication information for MAC, one HARQ ID may be mapped to one logical channel ID in the MAC.

The V2X controller may provide PHY/MAC duplication information for PHY to configure packet duplication in the PHY layer.

Furthermore, the PHY layer may configure a component carrier mapped to the HARQ ID using PHY/MAC duplication information for PHY provided by the V2X controller (2505). For example, if packet duplication is determined through a PRPP in the PHY/MAC, two or more component carrier IDs may be mapped to one HARQ entity.

Figure 26:
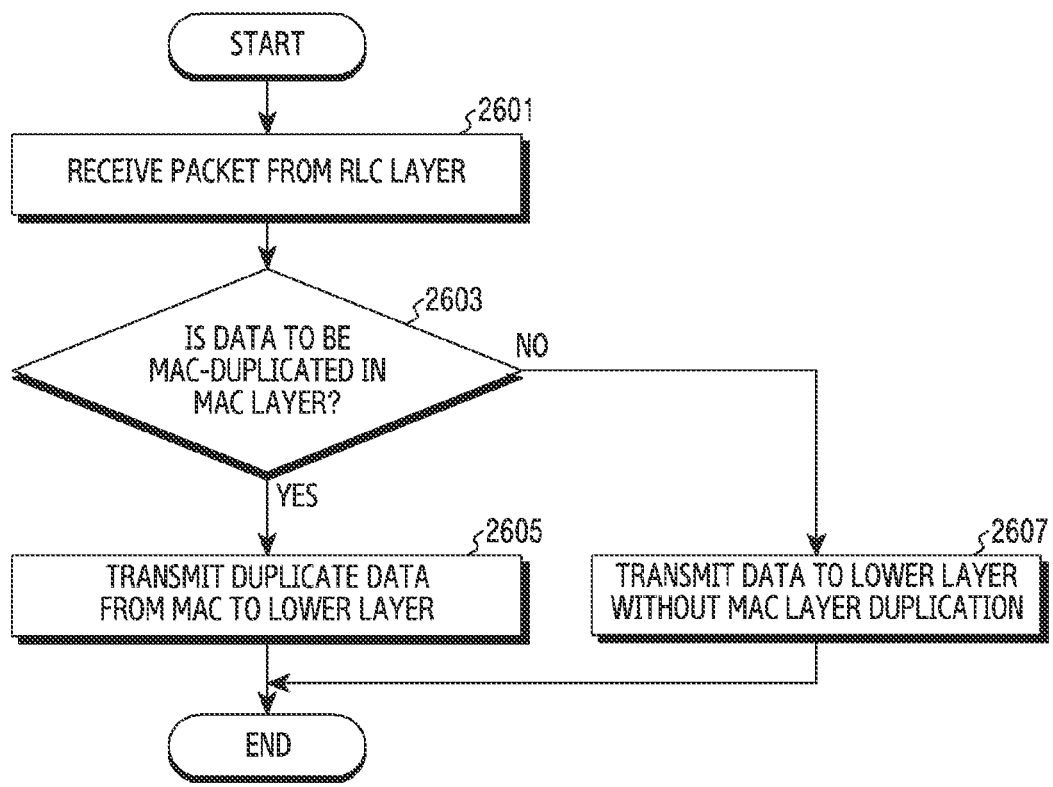
FIG. 26 is a flowchart illustrating an operation of processing a duplicate packet in a PHY/MAC layer after user traffic occurs in a transmitter according to various embodiments of the disclosure.

FIG. 26 is a flowchart illustrating an operation of processing a duplicate packet in a PHY/MAC layer after user traffic occurs in a transmitter according to various embodiments of the disclosure.

The MAC layer receives data from a higher layer, e.g., an RLC layer (2601). After checking a logical channel received from the RLC, the MAC layer may identify whether or not to perform MAC duplication (2603). Here, a duplicate logical channel and a non-duplicate logical channel may be preconfigured by a V2X controller.

If the MAC entity performs packet duplication, the MAC transmits the same data to two or more component carriers in one HARQ entity (2605). On the other hand, if the MAC entity does not perform packet duplication, the MAC transmits data by mapping one HARQ entity to one component carrier (2607).

Figure 27:
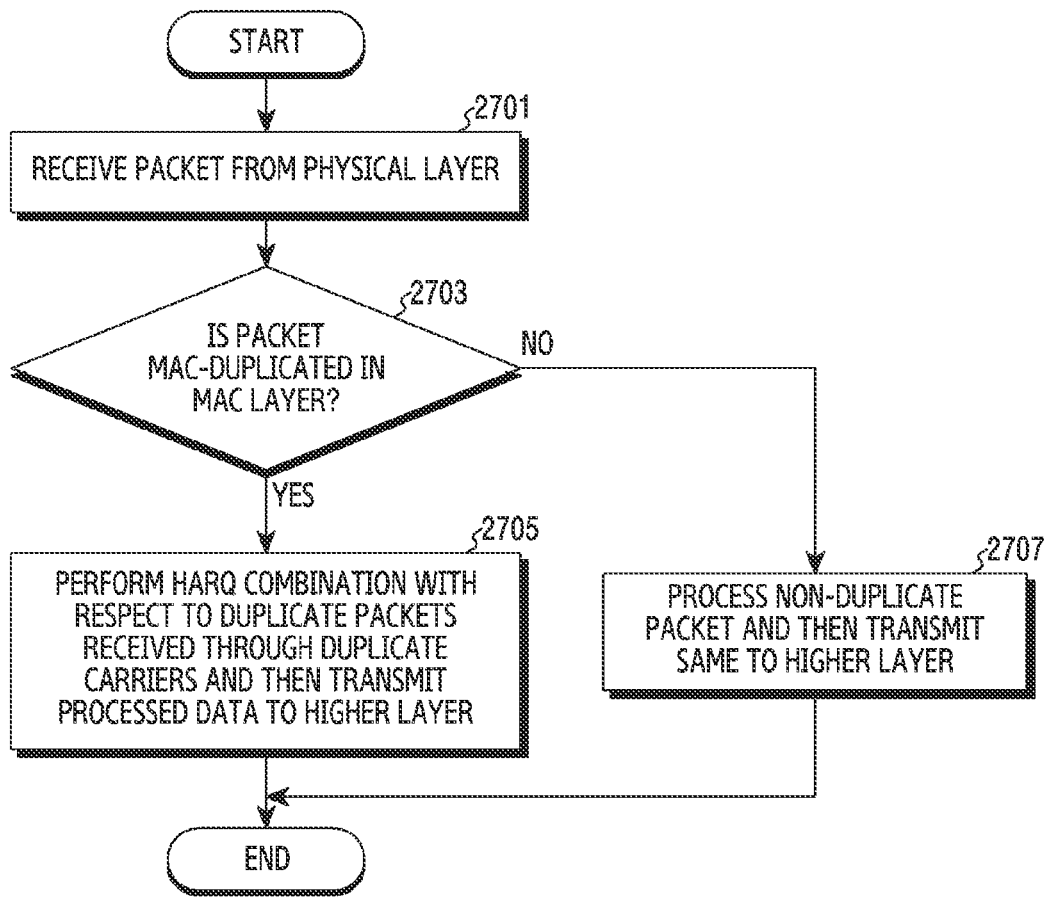
FIG. 27 is a flowchart illustrating an operation of processing a duplicate packet in a PHY/MAC layer after user traffic occurs in a receiver according to various embodiments of the disclosure.

FIG. 27 is a flowchart illustrating an operation of processing a duplicate packet in a PHY/MAC layer after user traffic occurs in a receiver according to various embodiments of the disclosure.

The operation flow of the receiver in FIG. 27 corresponds to the operation flow of the transmitter in FIG. 26.

The PHY layer receives data via a wireless section (2701). After checking a component carrier received from the PHY layer, the MAC may identify whether or not MAC packet duplication has been performed on the packet (2703). Here, configuration of the component carrier is performed in advance by the V2X controller.

If the data is a MAC duplicate packet, duplicated packets received through duplicate carriers are processed with HARQ combination, and the processed data is transmitted to a higher layer (2705). On the other hand, if the data is not a MAC duplicate packet, the data is processed according to non-duplicate packet, and is then transmitted to, for example, the MAC/RLC/PDCP layer (2707).

Figure 28:
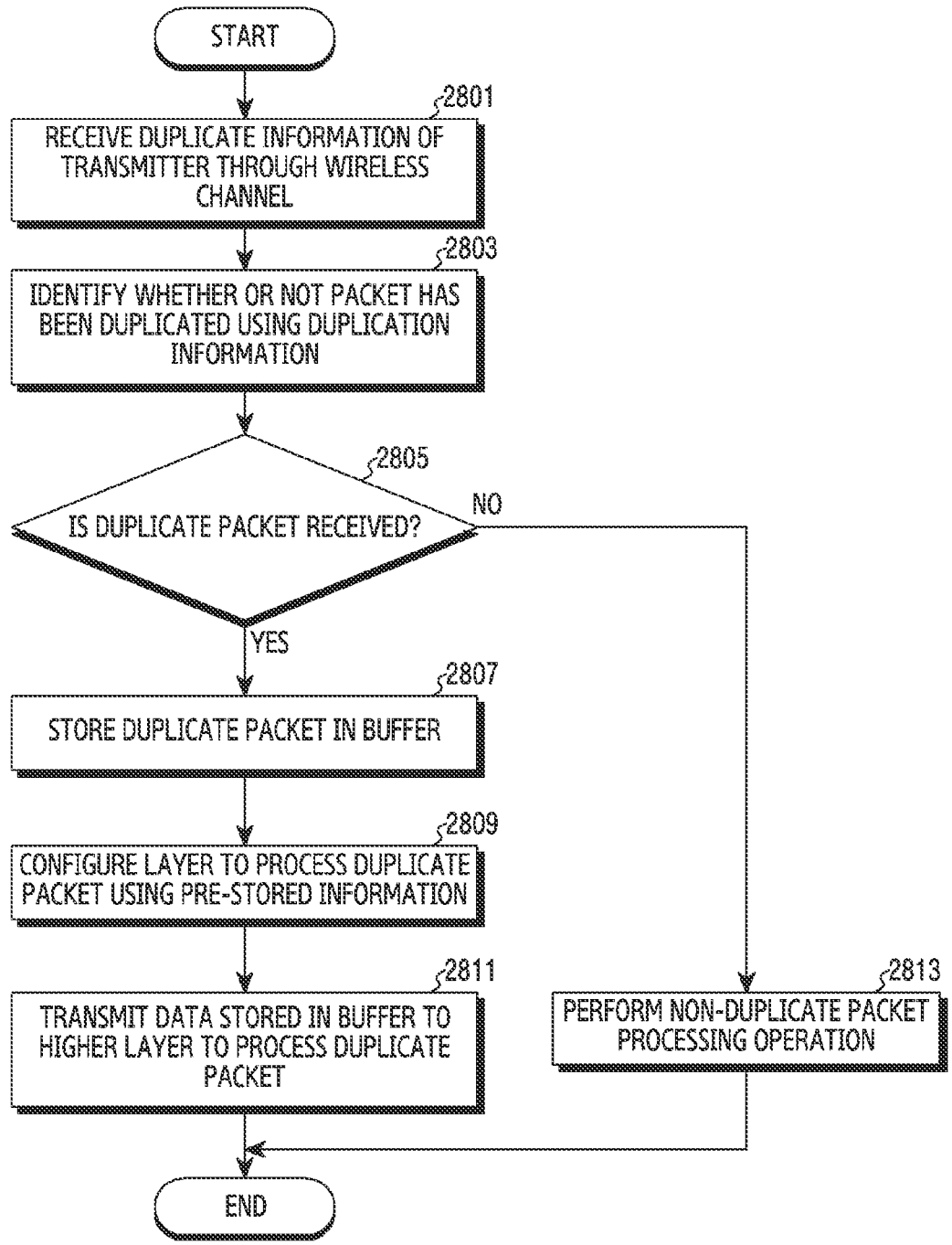
FIG. 28 is a flowchart illustrating an operation in which a receiver processes a duplicate packet using duplication information transmitted from a transmitter according to various embodiments of the disclosure.

FIG. 28 is a flowchart illustrating an operation in which a receiver processes a duplicate packet using duplication information transmitted from a transmitter according to various embodiments of the disclosure.

Hereinafter, Tables 1 to 3 and FIG. 28 show other embodiments of a configuration method for transmitting/receiving duplicate data, and relate to a method in which a transmitter provides notification of duplication or non-duplication through a wireless control channel and a method in which a receiver receives notification of duplication or non-duplication and configures a corresponding layer for processing packet duplication. The method described below may be applied to all of the PDCP duplication, the RLC duplication, and the MAC/PHY duplication described above.

TABLE 1

Priority
Resource Reservation
Frequency resource location
Time gap between initial transmission and retransmission
MCS
Retransmission index
Reserved bits Table 1 shows a configuration of V2X Sidelink control information indicating location information of resources and decoding information of data to be transmitted in the case of using a sidelink channel. Respective fields are configured as follows.

Priority, that is, an indicator indicating the priority considering the latency of a packet Resource reservation An indication of location information of resources transmitted through frequency resource location A time gap between initial transmission and retransmission An indication of a modulation and coding scheme of data transmitted through MCS An indication of the number of retransmissions through a retransmission index A reserved bit A receiver may identify the location or the like of data to receive through indicators of the control information (e.g., resource reservation, frequency resource location, MCS, etc.), thereby receiving data.

In particular, the resource reservation, the frequency resource location, and the MCS are control information indicating the resource to transmit data.

The control information may be referred to as "sidelink control information (SCI)", and is periodically transmitted from a transmitter to a receiver through a physical downlink sidelink control channel (PDSCCH).

TABLE 2

| Carrier-packet duplication | bitmap |
| --- | --- |

Table 2 shows a packet duplication indicator to indicate information on packet duplication, in addition to the control information in Table 1. In Table 2, the packet duplication indicator is represented by a bitmap.

Since it is difficult to identify whether or not a corresponding data is duplicate data using only the control information in Table 1, a carrier-packet duplication indicator may indicate whether or not the corresponding data is duplicate data. For example, the carrier-packet duplication indicator may be represented by a bitmap.

In detail, the bitmap may be represented by the number of bits equal to the number of carriers. The bitmap may be configured in ascending order of the carrier number from the left side thereof. That is, the first bit from the left of the bitmap may correspond to a first carrier. In addition, the bitmap may be configured in ascending order of the carrier number from the right side thereof. That is, the first bit from the right of the bitmap may correspond to a first carrier. If a bit value is configured as 0, it may indicate that packet duplication has not been performed on the corresponding carrier. If a bit value is configured as 1, it may indicate that packet duplication has been performed on the corresponding carrier. For example, if the bitmap is 000000, it means that no packet duplication has been performed on any carrier. In addition, for example, if the bitmap is 101000, it means that packets of the corresponding data are duplicated and transmitted in a first component carrier and a third component carrier.

Accordingly, the transmitter may configure information on whether or not the packet is duplicated and information on a carrier in which the packet is duplicated using the bitmap field in Table 2, and may transmit control information on the packet to be transmitted to the receiver. After identifying the bitmap field in Table 2, the receiver may obtain the information on whether or not the packet is duplicated and the information on a carrier in which the packet is duplicated, and may receive and process the data according to the field value.

In another embodiment, the bitmap field in Table 2 may be inserted as a new field into a MAC header of the data, instead of the sidelink control information.

TABLE 3

| Carrier-packet duplication (Multiple-original) | Carrier index |
| --- | --- |
| Carrier-packet duplication (Multiple-duplicate) | Carrier index |

Table 3 shows a packet duplication indicator to indicate information on packet duplication in addition to the control information in Table 1. In Table 3, the packet duplication indicator is represented as a carrier index.

Since it is difficult to identify whether or not a corresponding data is duplicate data using only the control information in Table 1, a carrier-packet duplication indicator in Table 3 may indicate whether or not the corresponding data is duplicate data. For example, a carrier index may be indicated by the carrier-packet duplication indicator. The carrier index may be represented as the number of bits representing the number of carriers, and may be represented using three bits in the case where eight component carriers are operated. The carrier index may include multiple-original and multiple-duplicate. For example, if control information that does not include multiple-original and multiple-duplicate is received, it indicates the transmission of data that is not duplicated. In addition, for example, if the index of multiple-original is 1 and if the index of multiple-duplicate is 3, this indicates data of which the packet is duplicated and transmitted in a first component carrier and a third component carrier.

The transmitter may configure information on whether or not the packet is duplicated and information on the carrier in which the packet is duplicated using the fields in Table 3, and may transmit control information on the packet to be transmitted. After identifying the corresponding fields, the receiver may obtain the information on whether or not the packet is duplicated and the information on the carrier in which the packet is duplicated, and may receive and process the data according to the field values.

In another embodiment, in the case where the transmitter transmits control information that does not include the fields proposed in Tables 2 and 3, it may indicate that packet duplication is not performed. In the case where control information that does not include the fields proposed in Tables 2 and 3 is received, the receiver may identify that packet duplication is not performed.

FIG. 28 is a diagram illustrating a method in which a receiver processes a duplicate packet using duplication information, such as SCI, transmitted from a transmitter.

The receiver may receive duplication information, for example, SCI information, from the transmitter through a wireless section (2801). The duplication information may be any one of Tables 1 to 3. The transmitter may identify whether or not the received data is a duplicate packet through the duplication information received from the transmitter (2803). For example, the receiver may recognize whether or not the received data is a duplicate packet through the fields in Tables 2 and 3 (2805).

Upon receiving a duplicate packet, the receiver may operate as follows:

1) The receiver temporarily stores the duplicate packet in a buffer (2807).
2) The receiver configures the layer to process the duplicate packet through information preconfigured using component carrier information of the duplicate packet (2809). Here, the preconfigured information may be configured using an RRC message through the base station, or may be preconfigured by the terminal. In addition, the layer to process the duplicate packet may be any one of the PDCP, the RLC, and the PHY/MAC.

For example, in the case of PDCP duplication, component carrier 1 and component carrier 3 are mapped to RLC A and RLC B, and RLC A and RLC B are mapped to the PDCP.

3) If the configuration of the layer to process the duplicate packet is completed, the duplicate packet temporarily stored in the buffer is transmitted to a higher layer to then be processed (2811).

If a duplicate packet is not received, the receiver may operate as follows:
1) The receiver performs a non-duplicate packet processing operation (2813). For example, data is directly transmitted to a higher layer.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a first device in a wireless communication system, the method comprising:
obtaining a configuration for a vehicle to everything (V2X) service;
identifying a parameter indicating a proximity service (ProSe) per-packet reliability (PPPR) value of a packet for the V2X service based on the configuration for the V2X service, wherein the PPPR value indicates a level of reliability required for the packet;
in case that the parameter is greater than or equal to a configured PPPR threshold, duplicating the packet; and
transmitting, to a second device of the V2X service, the packet and a duplicated packet.

2. The method of claim 1, wherein the PPPR threshold is preconfigured.

3. The method of claim 1, wherein the PPPR threshold is obtained through a configuration message.

4. The method of claim 1, wherein, in case the packet is duplicated, two different logical channels are mapped to one radio bearer.

5. The method of claim 1, wherein the packet is transmitted on a first component carrier, and the duplicated packet is transmitted on a second component carrier, and
wherein the first component carrier and the second component carrier are configured for a carrier aggregation.

6. The method of claim 1, wherein the parameter is identified further based on quality of service (QoS) information.

7. A method performed by a second device in a wireless communication system, the method comprising:
receiving, from a first device of a vehicle to everything (V2X) service, a first packet and a second packet;
identifying whether the first packet and the second packet are duplicated packets, wherein the first packet and the second packet are duplicated packets in case that a proximity service (ProSe) per-packet reliability (PPPR) value of the first packet for the V2X service is greater than or equal to a configured PPPR threshold, and wherein the PPPR indicates a level of reliability required for the packet; and
in case that the first packet and the second packet are duplicated packets, performing packet reordering.

8. The method of claim 7, further comprising, in case that the first packet and the second packet are duplicated packets, discarding a packet comprising data that is already received among the first packet and the second packet.

9. The method of claim 7, wherein whether the first packet and the second packet are duplicated packets is identified based on, logical channels of the first packet and the second packet.

10. The method of claim 7, wherein the first packet and the second packet have two different logical channel identifiers and comprise same data.

11. The method of claim 7, wherein, in case that the first packet and the second packet are duplicated packets, two different logical channels are mapped to one radio bearer.

12. The method of claim 7, wherein the first packet is received on a first component carrier, and the second packet is received on a second component carrier, and wherein the first component carrier and the second component carrier are configured for a carrier aggregation.

13. A first device in a wireless communication system, the first device comprising:

a transceiver; and at least one processor coupled with the transceiver and configured to:

obtain a configuration for a vehicle to everything (V2X) service, identify a parameter indicating a proximity service (ProSe) per-packet reliability (PPPR) value of a packet for the V2X service based on the configuration for the V2X service, wherein the PPPR value indicates a level of reliability required for the packet, in case that the parameter is greater than or equal to a configured PPPR threshold, duplicate the packet, and transmit, to a second device of the V2X service, the packet and a duplicated packet.

14. The first device of claim 13, wherein the PPPR threshold is preconfigured.

15. The first device of claim 13, wherein the PPPR threshold is obtained through a configuration message.

16. The first device of claim 13, wherein, in case the packet is duplicated, two different logical channels are mapped to one radio bearer.

17. The first device of claim 13, wherein the packet is transmitted on a first component carrier, and the duplicated packet is transmitted on a second component carrier, and wherein the first component carrier and the second component carrier are configured for a carrier aggregation.

18. A second device in a wireless communication system, the second device comprising:

a transceiver; and at least one processor coupled with the transceiver and configured to:

receive, from a first device of a vehicle to everything (V2X) service, a first packet and a second packet, identify whether the first packet and the second packet are duplicated packets, wherein the first packet and the second packet are duplicated packets in case that a proximity service (ProSe) per-packet reliability (PPPR) value of the first packet for the V2X service is greater than or equal to a configured PPPR threshold, and wherein the PPPR value indicates a level of reliability required for the packet, and in case that the first packet and the second packet are duplicated packets, perform packet reordering.

* * * * *